United States Patent
Gingras et al.

(10) Patent No.: US 11,403,658 B1
(45) Date of Patent: Aug. 2, 2022

(54) SYSTEMS AND METHODS FOR PROVIDING POST-TRANSACTION OFFERS

(71) Applicant: Shopify Inc., Ottawa (CA)

(72) Inventors: Martin Gingras, Mont-Royal (CA); Alexandre Bastien, Montréal (CA); Ariel Borahm Cho, Montréal (CA); Denis Lins, Montréal (CA); Olga Kudinova, Toronto (CA); Korosh Koochekian Sabor, Montréal (CA); Sara Hill, Penticton (CA); Constance Cerf, Montréal (CA); Xiaopong Tran, Montréal (CA); Robin Drexler, Montréal (CA); Derek Pyne, Toronto (CA); Mehmet Emrah Celik, Kitchener (CA); Jared Dykstra, Kitchener (CA); Kevan Davis, Carrollton, TX (US); Thomas Lacher, Montréal (CA); Louis-Philippe Labelle Cloutier, Gatineau (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/201,777

(22) Filed: Mar. 15, 2021

(51) Int. Cl.
*G06Q 30/02* (2012.01)

(52) U.S. Cl.
CPC ..... *G06Q 30/0222* (2013.01); *G06Q 30/0224* (2013.01); *G06Q 30/0239* (2013.01)

(58) Field of Classification Search
None
See application file for complete search history.

(56) References Cited

U.S. PATENT DOCUMENTS

| | | | |
|---|---|---|---|
| 10,339,549 B1* | 7/2019 | Ramalingam | H04W 4/029 |
| 2003/0105667 A1* | 6/2003 | Millikan | G06Q 30/0272 705/14.58 |
| 2014/0278964 A1* | 9/2014 | Ganesh | G06Q 30/0253 705/14.51 |
| 2015/0302457 A1* | 10/2015 | Azevedo | G06F 16/248 705/14.39 |
| 2016/0140519 A1* | 5/2016 | Trepca | G06N 7/005 705/26.44 |
| 2021/0089939 A1* | 3/2021 | Falque-Pierrotin | G06N 5/003 |
| 2021/0264467 A1* | 8/2021 | Boal | G06Q 30/0207 |

OTHER PUBLICATIONS

H. LoyalLion, "How post-purchase upsells can increase your ecommerce revenue", retrieved from https://loyaltylion.com/blog/how-post-purchase-upsells-can-increase-your-ecommerce-revenue, available on Jan. 31, 2017 (Year: 2017).*

* cited by examiner

*Primary Examiner* — Sam Refai
(74) *Attorney, Agent, or Firm* — Ridout & Maybee LLP

(57) ABSTRACT

Systems and methods for selectively providing post-transaction offers are described. During a transaction process for a first transaction associated with an online store, a request to provide a post-transaction offer is received. A first trust indicator associated with the online store is determined. The first trust indicator is based on historical customer response to the same or a different post-transaction offer. After determining that the first trust indicator satisfies a first trust threshold, the post-transaction offer is provided after completion of the first transaction.

20 Claims, 8 Drawing Sheets

SYSTEMS AND METHODS FOR PROVIDING POST-TRANSACTION OFFERS

FIELD

The present disclosure is related to systems and methods for managing post-transaction offers. In particular, the present disclosure relates to systems and methods for dynamically controlling the selective presentation of post-transaction offers based on an indicator that is determined from historical response data.

BACKGROUND

An e-commerce platform can provide merchants with the option of providing post-transaction offers to customers of the merchant's online store. A post-transaction offer (also referred to as a post-purchase offer) is an opportunity for a merchant to provide an advertisement or a purchase opportunity to a customer, after the customer has completed an initial transaction (e.g., completed an initial purchase). A post-transaction offer may include a cross-sell offer or an up-sell offer, for example.

Post-transaction offers are attractive to a merchant because the post-transaction offer is presented to a customer after a preceding transaction has already been completed by the customer. Thus, it is a relatively simple way to increase the sales at the merchant's online store, without risking the loss of a current sale.

SUMMARY

A post-transaction offer is typically intended to be provided as part of a transaction process (also referred to as a checkout process). For example, a post-transaction offer may be provided as part of a thank you page, or provided as a single page inserted prior to the thank you page. Thus, the post-transaction offer may contribute positively or negatively to the overall customer experience with an online store and with an e-commerce platform (or any other online or offline platform where transactions can be conducted). The e-commerce platform may not have direct control over the post-transaction offer that a merchant wishes to provide at their online store. For example, an online store may use a third-party application to insert the post-transaction offer into the transaction process that is normally provided by the e-commerce platform.

Conventional solutions to control post-transaction offers may use indiscriminate restrictions, such as simply blocking post-transaction offers across all stores on the e-commerce platform. However, such approaches are unappealing to merchants because there is significant loss of potential cross-sell or upsell opportunities. On the other hand, indiscriminately allowing post-transaction offers may not only negatively impact customer experience on the e-commerce platform, such an approach may also be a waste of computer processing resources, because memory and processing power is wasted on providing post-transaction offers that are not attractive to customers (or that are ignored or skipped by customers).

It is therefore desirable to provide a way to more finely manage post-transaction offers. Further, because of the fast-changing nature of online commerce, it is desirable to provide a way to dynamically control the selective presentation of post-transaction offers in real-time (or near real-time) as a transaction is completed.

It is difficult, if not impossible, for a merchant or an operator of the e-commerce platform to manually determine, during the transaction process in real-time (or near real-time), whether a specific customer would react negatively to a post-transaction offer at a particular online store and hence whether or not a post-transaction offer should be provided. A solution that relies solely or mainly on human intervention may be insufficiently fast to manage post-transaction offers during the transaction process.

A problem with post-transaction offers is that they may elicit a negative customer response, such as a customer disliking the post-transaction offer or a customer being confused by the post-transaction offer, among other possibilities. A negative response may cause the customer to lose trust in the online store, checkout application (or checkout platform) and/or the e-commerce platform. As such, if a customer has a negative response to a post-transaction offer, the customer's trust in the e-commerce platform, as well as in the online store, may be negatively impacted. There is therefore a need to provide a way for the e-commerce platform to manage and control the post-transaction offers.

Accordingly, examples described herein may enable a more intelligent way to selectively provide post-transaction offers. In particular, the determination to provide or not provide post-transaction offers may be dynamically made and fine-tuned in real-time (or near real-time), during the transaction process.

In some examples, presentation of post-transaction offers may be managed in a way that encourages a merchant to improve customers' experiences with post-transaction offers provided at their online store. For example, positive customer responses to post-transaction offers provided at a merchant's online store may result in the merchant being permitted to provide post-transaction offers at their online store using enhanced presentation formats.

In some examples, the present disclosure describes a method for selectively providing post-transaction offers in real-time or near real-time. The method includes: during a transaction process for a first transaction associated with an online store: receiving a request to provide a post-transaction offer; determining a first trust indicator associated with the online store, the first trust indicator being based on historical customer response to the same or different post-transaction offer; determining that the first trust indicator satisfies a first trust threshold; and responsive to determining that the first trust indicator satisfies the first trust threshold, providing the post-transaction offer after completion of the first transaction.

In any of the above examples, the method may include: receiving, responsive to the providing of the post-transaction offer, an indicator that the post-transaction offer was accepted; and responsive to receiving the indicator, completing a second transaction for the post-transaction offer using information associated with the first transaction.

In any of the above examples, the first and second transactions may be grouped into a single order.

In any of the above examples, the method may include: during a transaction process for a third transaction associated with the online store: receiving another request to provide the post-transaction offer; determining a second trust indicator associated with the online store; determining that the second trust indicator fails the first trust threshold; and responsive to determining that the second trust indicator fails the first trust threshold, blocking the post-transaction offer from being provided.

In any of the above examples, the method may include: responsive to determining that the second trust indicator fails the first trust threshold, generating a notification that the post-transaction offer was blocked.

In any of the above examples, the first transaction may be associated with a first customer characteristic and the first trust indicator may be based on historical customer response associated with the first customer characteristic. The third transaction may be associated with a second customer characteristic and the second trust indicator may be based on historical customer response associated with the second customer characteristic.

In any of the above examples, the first trust indicator may be determined based on at least one of: historical customer response to any post-transaction offers by the online store; historical customer response to any post-transaction offers by one or more other online stores having a characteristic in common with the online store; historical customer response to the same post-transaction offer at one or more other online stores; historical customer response to any post-transaction offers, associated with a customer characteristic in common with the first transaction; or historical customer response to any post-transaction offers having an offer characteristic in common with the same post-transaction offer.

In any of the above examples, the historical customer response may include measurements of one or more of: a historical conversion rate; a historical refund rate; or a historical help request rate.

In any of the above examples, the method may include: responsive to determining that the first trust indicator satisfies a second trust threshold that is more restrictive than the first trust threshold, providing the post-transaction offer after completion of the first transaction using an enhanced presentation format.

In any of the above examples, the enhanced presentation format may include one or more of: a larger presentation area; an enhanced font; an animation; or a graphic.

In any of the above examples, the post-transaction offer may be provided at or immediately before a last page in the transaction process.

In some example aspects, the present disclosure describes a system for selectively providing post-transaction offers. The system includes a processor in communication with storage. The processor configured to execute instructions from the storage to cause the system to: during a transaction process for a first transaction associated with an online store: receive a request to provide a post-transaction offer; determine a first trust indicator associated with the online store, the first trust indicator being based on historical customer response to the same or different post-transaction offer; determine that the first trust indicator satisfies a first trust threshold; and responsive to determining that the first trust indicator satisfies the first trust threshold, provide the post-transaction offer after completion of the first transaction.

In some examples, the system may implement an e-commerce platform.

In some examples, the processor may be configured to execute instructions to cause the system to perform any of the methods described herein.

In some example aspects, the present disclosure describes a computer-readable medium storing instructions that, when executed by a processor of a system, cause the system to: during a transaction process for a first transaction associated with an online store: receive a request to provide a post-transaction offer; determine a first trust indicator associated with the online store, the first trust indicator being based on historical customer response to the same or different post-transaction offer; determine that the first trust indicator satisfies a first trust threshold; and responsive to determining that the first trust indicator satisfies the first trust threshold, provide the post-transaction offer after completion of the first transaction.

In some examples, the computer-readable medium, when executed by the processor, may cause the system to perform any of the methods described herein.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure will be described in the context of an e-commerce platform, discussed below. However, it should be understood that this discussion is only for the purpose of illustration and is not intended to be limiting. Further, it should be understood that the present disclosure may be implemented in other contexts, and is not necessarily limited to implementation in an e-commerce platform.

Figure 1:
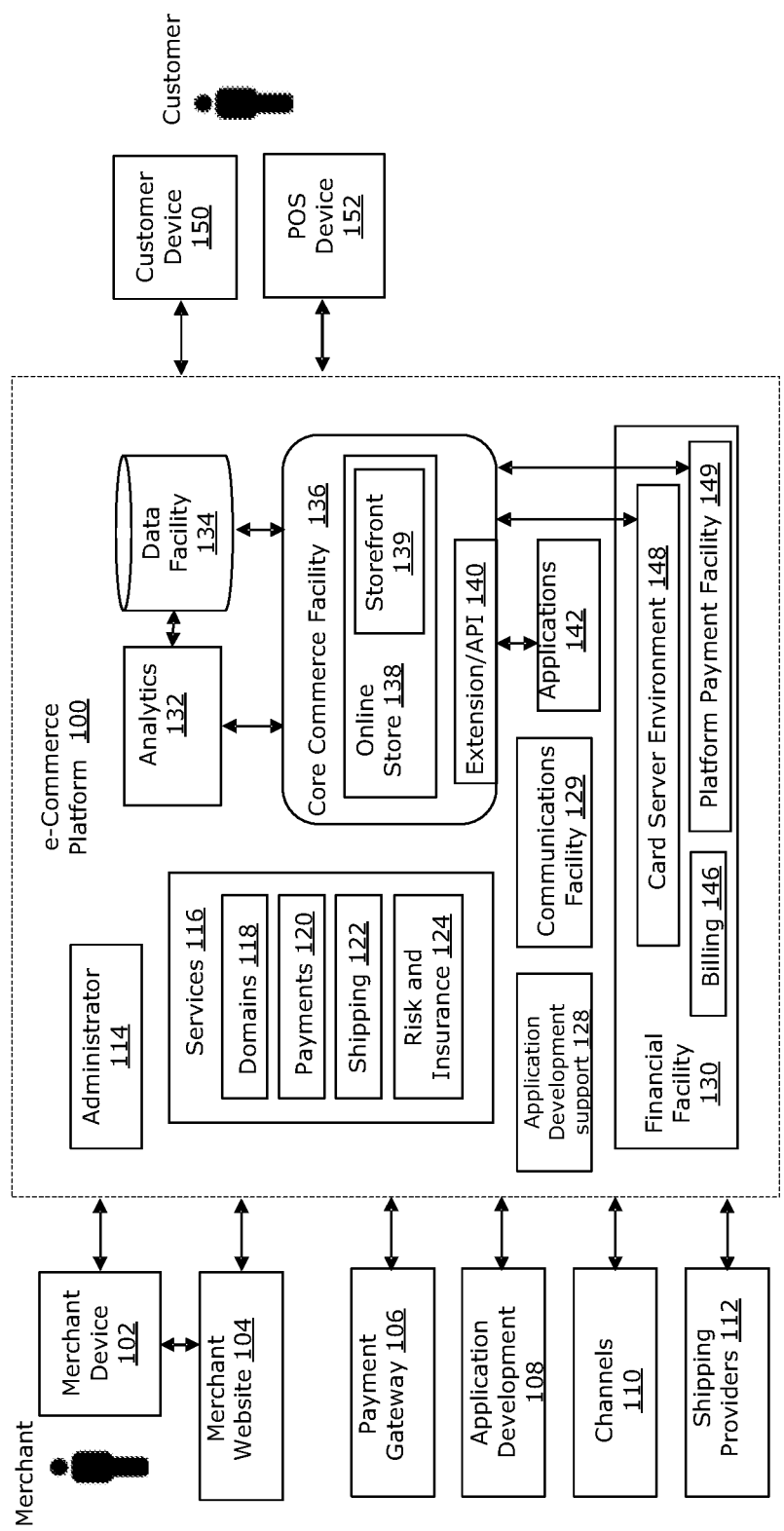
FIG. 1 is a block diagram of an example e-commerce platform, in which examples described herein may be implemented.

FIG. 1 is a block diagram illustrating an example e-commerce platform 100, in which examples disclosed herein may be implemented. In the context of the present disclosure, an e-commerce platform 100 may be defined as an environment (e.g., providing processor resources, memory, etc.) via which merchants may offer products and/or services that may be purchased by customers. The e-commerce platform 100 may also enable business-to-business (B2B) commercial transactions, for example between wholesale suppliers and retailers. The present disclosure describes transactions related to physical products. However, the present disclosure is not limited to commercial transactions of physical products. In some instances, a purchase or sale may have both physical and non-physical aspects (e.g., a service may be associated with sale of a physical product). For simplicity, the term "products" in the present disclosure may encompass both physical products and services. The e-commerce platform 100 may also be referred to as a fulfillment platform.

While the disclosure throughout contemplates that a "merchant", a "user" and a "customer" may be more than individuals, for simplicity the description herein may generally refer to merchants, users and customers as such. All references to merchants, users and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, it should be understood that merchants and customers may also be generally referred to as users of the e-commerce platform 100, and aspects of the e-commerce platform 100 may be more generally available to support users in an e-commerce environment. All references to merchants and customers throughout this disclosure should also be understood to be references to users, such as where a user is a merchant-user (e.g., a B2B seller, supplier, wholesaler, retailer, or provider of products and/or services) or a customer-user (e.g., a buyer, purchase agent, or user of products and/or services), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Further, it should be understood that any individual or group of individuals may play more than one role and may fit more than one label in the e-commerce environment. For example, a corporate user may also be a customer.

The e-commerce platform 100 may provide a centralized system for providing merchants with online resources for managing their business. Merchants may utilize the e-commerce platform 100 for managing commerce with customers, such as by implementing an e-commerce experience with customers through an online store 138, through channels 110, through point of sale (POS) devices 152 in physical locations (e.g., a physical storefront or other location such as through a kiosk, terminal, reader, printer, 3D printer, and the like), by managing their business through the e-commerce platform 100, by interacting with customers through a communications facility 129 of the e-commerce platform 100, or any combination thereof. A merchant may sell products through both physical storefronts and the virtual storefront 139 of the online store 138.

The e-commerce platform 100 may also provide a centralized system for enabling B2B transactions between retailers and suppliers. For example, retailers may access an online store 138 belonging to a supplier to complete B2B transactions. For simplicity, the following discussion will be in the context of an online store 138 associated with a retail merchant, however it should be understood that the discussion may be similarly applicable to suppliers. Further, the term "merchants" may encompass both retailers and suppliers.

The online store 138 may represent a multitenant facility comprising a plurality of virtual storefronts 139. In various embodiments, merchants may manage one or more storefronts 139 in the online store 138, such as through a merchant device 102 (e.g., computer, laptop computer, mobile computing device, and the like), and offer products to customers through a number of different channels 110 (e.g., an online store 138; a physical storefront through a POS device 152; electronic marketplace, through an electronic buy button integrated into a website or social media channel such as on a social network, social media page, social media messaging system; and the like). A merchant may sell across channels 110 and then manage their sales through the e-commerce platform 100. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront 139 through the online store 138, and utilizing the communications facility 129 to leverage customer interactions and analytics 132 to improve the probability of sales, for example.

In various embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication, and the like, providing a system for reaching customers and facilitating merchant services for the real or virtual pathways available for reaching and interacting with customers.

In various embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application development 108, channels 110, shipping providers 112, customer devices 150, POS devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices 152, and the like). In various embodiments, elements of the e-commerce platform 100 may be implemented to operate on various platforms and operating systems, such as iOS, Android, over the internet, and the like.

In various embodiments, storefronts 139 may be served by the e-commerce platform 100 to customers (e.g., via customer devices 150), where customers can browse and purchase the various products available (e.g., add them to a cart, purchase immediately through a buy-button, and the like). Storefronts 139 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their storefront 139. Merchants may customize the look and feel of their website through a theme system, such as where merchants can select and change the look and feel of their storefront 139 by changing their theme while having the same underlying product and business data shown within the storefront's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a basic content management system for website content. Merchants may author blog posts or static pages and publish them to their storefront 139 and/or website 104, such as through blogs, articles, and the like, as well as configure navigation menus. Merchants may upload images (e.g., for products), video, content, data, and the like to the e-commerce platform 100, such as for storage by the system. In various embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110, including the online store 138, over the telephone, as well as through physical POS devices 152 as described herein. The e-commerce platform 100 may provide business support services 116, an administrator component 114, and the like associated with running an on-line business, such as providing a domain service 118 associated with their online store, payments services 120 for facilitating transactions with a customer, shipping services 122 for providing customer shipping options for purchased products, risk and insurance services 124 associated with product protection and liability, merchant billing services 146, and the like. Services 116 may be provided via the e-commerce platform 100 or in association with external facilities, such as through a payment gateway 106 for payment processing, shipping providers 112 for expediting the shipment of products, and the like.

In various embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
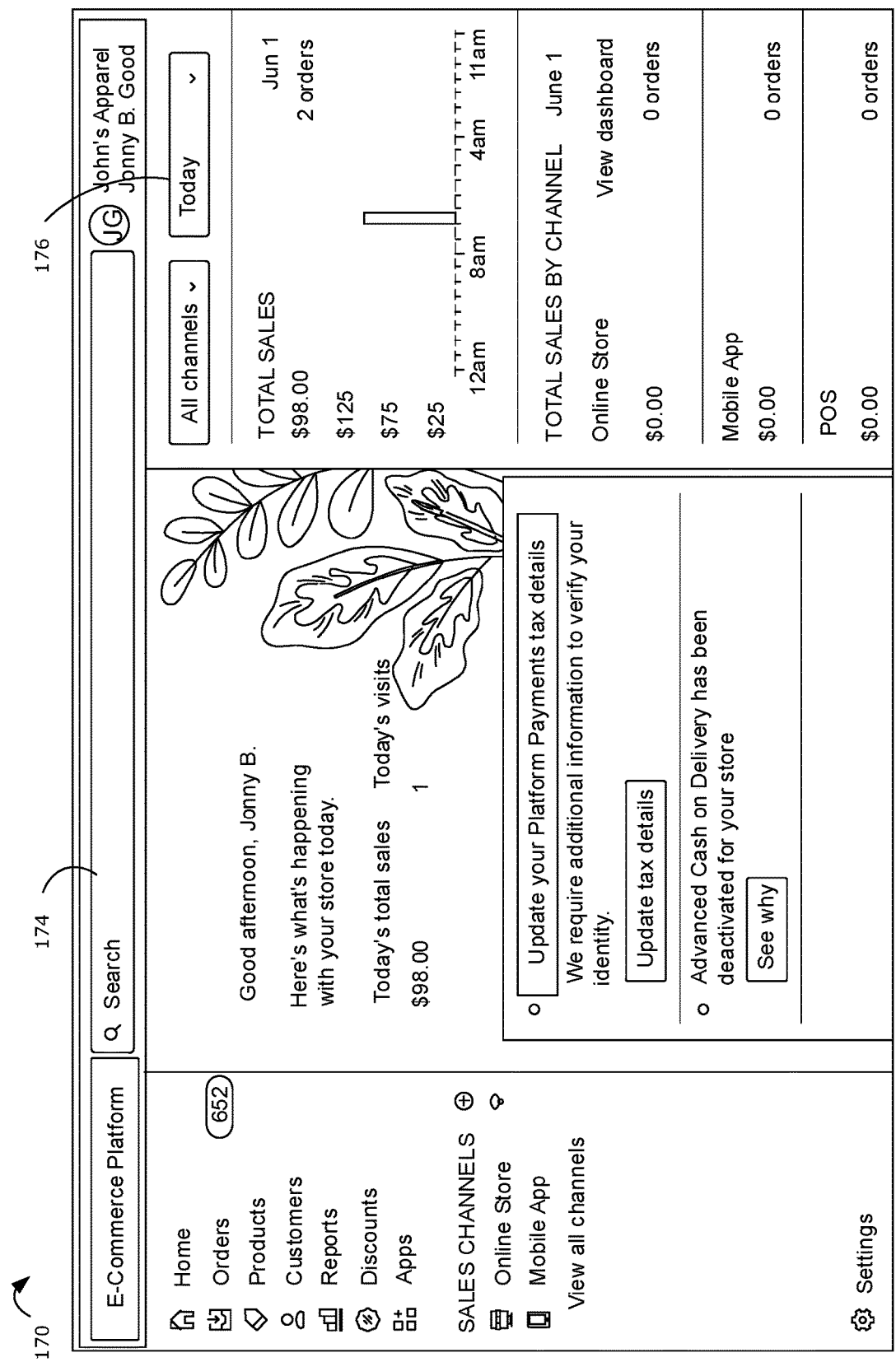
FIG. 2 is an example homepage of an administrator, which may be accessed via the e-commerce platform of FIG. 1.

FIG. 2 depicts a non-limiting embodiment for a home page 170 of an administrator 114, which may show information about daily tasks, a store's recent activity, and the next steps a merchant can take to build their business. In various embodiments, a merchant may log in to administrator 114, such as from a browser or mobile device, and manage aspects of their storefront 139, such as viewing the storefront's recent activity, updating the storefront's catalog, managing orders, recent visits activity, total orders activity, and the like. In various embodiments, the merchant may be able to access the different sections of administrator 114 by using the sidebar 172, such as shown on FIG. 2. Sections of the administrator may include core aspects of a merchant's business, including orders, products, and customers; sales channels, including the online store, POS, and buy button; applications installed on the merchant's account; settings applied to a merchant's storefront 139 and account. A merchant may use a search bar 174 to find products, pages, or other information. Depending on the device the merchant is using, they may be enabled for different functionality through the administrator 114. For instance, if a merchant logs in to the administrator 114 from a browser, they may be able to manage all aspects of their storefront 139. If the merchant logs in from their mobile device, they may be able to view all or a subset of the aspects of their storefront 139, such as viewing the storefront's recent activity, updating the storefront's catalog, managing orders, and the like.

More detailed information about commerce and visitors to a merchant's storefront 139 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110 from different periods of time (e.g., days, weeks, months, and the like), such as by using drop-down menus 176. An overview dashboard may be provided for a merchant that wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's storefront 139, such as based on account status, growth, recent customer activity, and the like. Notifications may be provided to assist a merchant with navigating through a process, such as capturing a payment, marking an order as fulfilled, archiving an order that is complete, and the like.

Reference is made back to FIG. 1. The e-commerce platform may provide for a communications facility 129 and associated merchant interface for providing electronic communications and marketing, such as utilizing an electronic messaging aggregation facility (not shown) for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 130 for secure financial transactions with customers, such as through a secure card server environment 148. The e-commerce platform 100 may store credit card information, such as in payment card industry data (PCI) environments (e.g., a card server), to reconcile financials, bill retailers, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 130 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In various embodiments, an online store 138 may support a great number of independently administered storefronts 139 and process a large volume of transactional data on a daily basis for a variety of products. Transactional data may include customer contact information, billing information, shipping information, information on products purchased, information on services rendered, and any other information associated with business through the e-commerce platform 100. In various embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

In various embodiments, the e-commerce platform 100 may be configured with a core commerce facility 136 for content management and task automation to enable support and services to the plurality of storefronts 139 (e.g., related to products, inventory, customers, orders, collaboration, suppliers, reports, financials, risk and fraud, and the like), but be extensible through applications 142 that enable greater flexibility and custom processes required for accommodating an ever-growing variety of merchant storefronts 139, POS devices 152, products, and services. For instance, the core commerce facility 136 may be configured for flexibility and scalability through portioning (e.g., sharding) of functions and data, such as by customer identifier, order identifier, storefront identifier, and the like. The core commerce facility 136 may accommodate store-specific business logic and a web administrator. The online store 138 may represent a channel, be embedded within the core commerce facility 136, provide a set of support and debug tools that support uses for merchants, and the like. The core commerce facility 136 may provide centralized management of critical data for storefronts 139.

The core commerce facility 136 includes base or "core" functions of the e-commerce platform 100, and as such, as described herein, not all functions supporting storefronts 139 may be appropriate for inclusion. For instance, functions for inclusion into the core commerce facility 136 may need to exceed a core functionality threshold through which it may be determined that the function is core to a commerce experience (e.g., common to a majority of storefront activity, such as across channels, administrator interfaces, merchant locations, industries, product types, and the like), is re-usable across storefronts (e.g., functions that can be re-used/modified across core functions), limited to the context of a single storefront at a time (e.g., implementing a storefront "isolation principle", where code should not be able to interact with multiple storefronts at a time, ensuring that storefronts cannot access each other's data), provide a transactional workload, and the like. Maintaining control of what functions are implemented may enable the core commerce facility 136 to remain responsive, as many required features are either served directly by the core commerce facility 136 or enabled by its extension/application programming interface (API) 140 connection to applications 142. If care is not given to restricting functionality in the core commerce facility 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 136 may be configured to maintain responsiveness, such as through configuration that utilizes timeouts, queues, back-pressure to prevent degradation, and the like.

Although isolating storefront data is important to maintaining data privacy between storefronts 139 and merchants, there may be reasons for collecting and using cross-store data, such as for example, with an order risk assessment system or a platform payment facility, both of which require information from a majority of storefronts 139 to perform well. In various embodiments, rather than violating the isolation principle, it may be preferred to move these components out of the core commerce facility 136 and into their own infrastructure within the e-commerce platform 100. For example, the data facility 134 and analytics 132 may be located outside the core commerce facility 136.

In various embodiments, the e-commerce platform 100 may provide for a platform payment facility 149, which is another example of a component that utilizes data from the core commerce facility 138 but may be located outside so as to not violate the isolation principle. The platform payment facility 149 may allow customers interacting with storefronts 139 to have their payment information stored safely by the core commerce facility 136 such that they only have to enter it once. When a customer visits a different storefront 139, even if they've never been there before, the platform payment facility 149 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across storefronts 139. It would be difficult and error prone for each storefront 139 to be able to connect to any other storefront 139 to directly retrieve the payment information stored there. As a result, the platform payment facility 149 may be implemented external to the core commerce facility 136.

For those functions that are not included within the core commerce facility 138, applications 142 provide a way to add features to the e-commerce platform 100. Applications 142 may be able to access and modify data on a merchant's storefront 139, perform tasks through the administrator 114, create new flows for a merchant through a user interface (e.g., that is surfaced through extensions/API 140), and the like. Merchants may be enabled to discover and install applications 142 through application searching 208 and application recommendations 210 (see FIG. 3). In various embodiments, core products, core extension points, applications, and the administrator 114 may be developed to work together. For instance, application extension points may be built inside the administrator 114 so that core features may be extended by way of applications 142, which may deliver functionality to a merchant through the extension/API 140.

In various embodiments, applications 142 may deliver functionality to a merchant through the extension/API 140, such as where an application 142 is able to surface transaction data to a merchant (e.g., App: "Surface my app in mobile and web admin using the embedded app SDK"), and/or where the core commerce facility 136 is able to ask the application to perform work on demand (core: "App, give me a local tax calculation for this checkout").

Applications 142 may support storefronts 139 and channels 110, provide merchant support, integrate with other services, and the like. Where the core commerce facility 136 may provide the foundation of services to the storefront 139, the applications 142 may provide a way for merchants to satisfy specific and sometimes unique needs. Different merchants will have different needs, and so may benefit from different applications 142. Applications 142 may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142 may be connected to the core commerce facility 136 through an extension/API layer 140, such as utilizing APIs to expose the functionality and data available through and within the core commerce facility 136 to the functionality of applications (e.g., through REST, GraphQL, and the like). For instance, the e-commerce platform 100 may provide API interfaces to merchant- and partner-facing products and services, such as may include, for example, application extensions, process flow services, developer-facing resources, and the like. With customers more frequently using mobile devices for shopping, applications 142 related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the core commerce facility 136, thus providing merchants what they need when they need it. For instance, shipping services 122 may be integrated with the core commerce facility 136 through a shipping or carrier service API, thus enabling the e-commerce platform 100 to provide shipping service functionality without directly impacting code running in the core commerce facility 136.

Many merchant problems may be solved by letting partners (e.g., third-party service providers) improve and extend merchant workflows through application development, such as problems associated with back-office operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 142, through extension/API 140, help make products easy to view and purchase in a fast growing marketplace. In various embodiments, partners, application developers, internal applications facilities, and the like, may be provided with a software development kit (SDK), such as through creating a frame within the administrator 114 that sandboxes an application interface. In various embodiments, the administrator 114 may not have control over nor be aware of what happens within the frame. The SDK may be used in conjunction with a user interface kit to produce interfaces that mimic the look and feel of the e-commerce platform 100, such as acting as an extension of the core commerce facility 136.

Applications 142 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 136, such as for synchronizing a local database, notifying an external integration partner, and the like. Update events may enable this functionality without having to poll the core commerce facility 136 all the time to check for updates, such as through an update event subscription. In various embodiments, when a change related to an update event subscription occurs, the core commerce facility 136 may post a request, such as to a predefined callback URL. The body of this request may contain a new state of the object and a description of the action or event. Update event subscriptions may be created manually, in the administrator facility 114, or automatically (e.g., via the API). In various embodiments, update events may be queued and processed asynchronously from a state change that triggered them, which may produce an update event notification that is not distributed in real-time.

Figure 3:
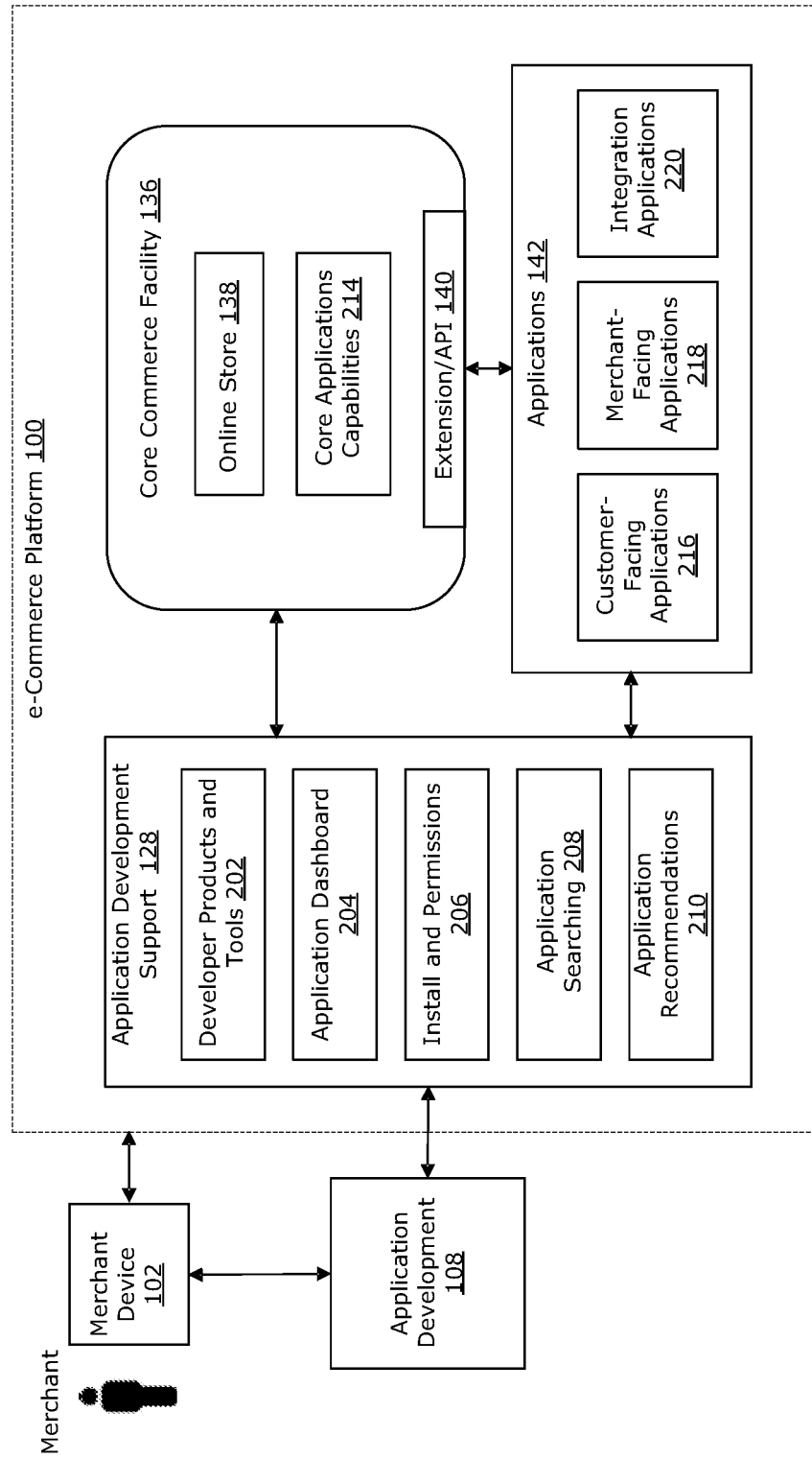
FIG. 3 is another block diagram of the e-commerce platform of FIG. 1, showing some details related to application development.

Reference is made to FIG. 3, which is another depiction of the e-commerce platform 100. FIG. 3 omits some details that have been described with reference to FIG. 1, and shows further details discussed below. In various embodiments, the e-commerce platform 100 may provide application development support 128. Application development support 128 may include developer products and tools 202 to aid in the development of applications, an application dashboard 204 (e.g., to provide developers with a development interface, to administrators for management of applications, to merchants for customization of applications, and the like), facilities for installing and providing permissions 206 with respect to providing access to an application 142 (e.g., for public access, such as where criteria must be met before being installed, or for private use by a merchant), application searching 208 to make it easy for a merchant to search for applications 142 that satisfy a need for their storefront 139, application recommendations 210 to provide merchants with suggestions on how they can improve the user experience through their storefront 139, a description of core application capabilities 214 within the core commerce facility 136, and the like. These support facilities may be utilized by application development 108 performed by any entity, including the merchant developing their own application 142, a third-party developer developing an application 142 (e.g., contracted by a merchant, developed on their own to offer to the public, contracted for use in association with the e-commerce platform 100, and the like), or an application being developed by internal personal resources associated with the e-commerce platform 100. In various embodiments, applications 142 may be assigned an application identifier (ID), such as for linking to an application (e.g., through an API), searching for an application, making application recommendations, and the like.

The core commerce facility 136 may include base functions of the e-commerce platform 100 and expose these functions through APIs to applications 142. The APIs may enable different types of applications built through application development 108. Applications 142 may be capable of satisfying a great variety of needs for merchants but may be grouped roughly into three categories: customer-facing applications 216, merchant-facing applications 218, or integration applications 220. Customer-facing applications 216 may include storefront 139 or channels 110 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 218 may include applications that allow the merchant to administer their storefront 139 (e.g., through applications related to the web or website or to mobile devices), run their business (e.g., through applications related to POS devices 152), to grow their business (e.g., through applications related to shipping (e.g., drop shipping), use of automated agents, use of process flow development and improvements), and the like. Integration applications 220 may include applications that provide useful integrations that participate in the running of a business, such as shipping providers 112 and payment gateways.

In various embodiments, an application developer may use an application proxy to fetch data from an outside location and display it on the page of an online storefront 139. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142 so that the core commerce facility 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 110. A channel 110 is a place where customers can view and buy products. In various embodiments, channels 110 may be modeled as applications 142 (a possible exception being the online store 138, which is integrated within the core commence facility 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In various embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110 may use the core commerce facility 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through the card server environment 148. In various embodiments, the payment gateway 106 may accept international payment, such as integrating with leading international credit card processors. The card server environment 148 may include a card server application, card sink, hosted fields, and the like. This environment may act as the secure gatekeeper of the sensitive credit card information.

Figure 4:
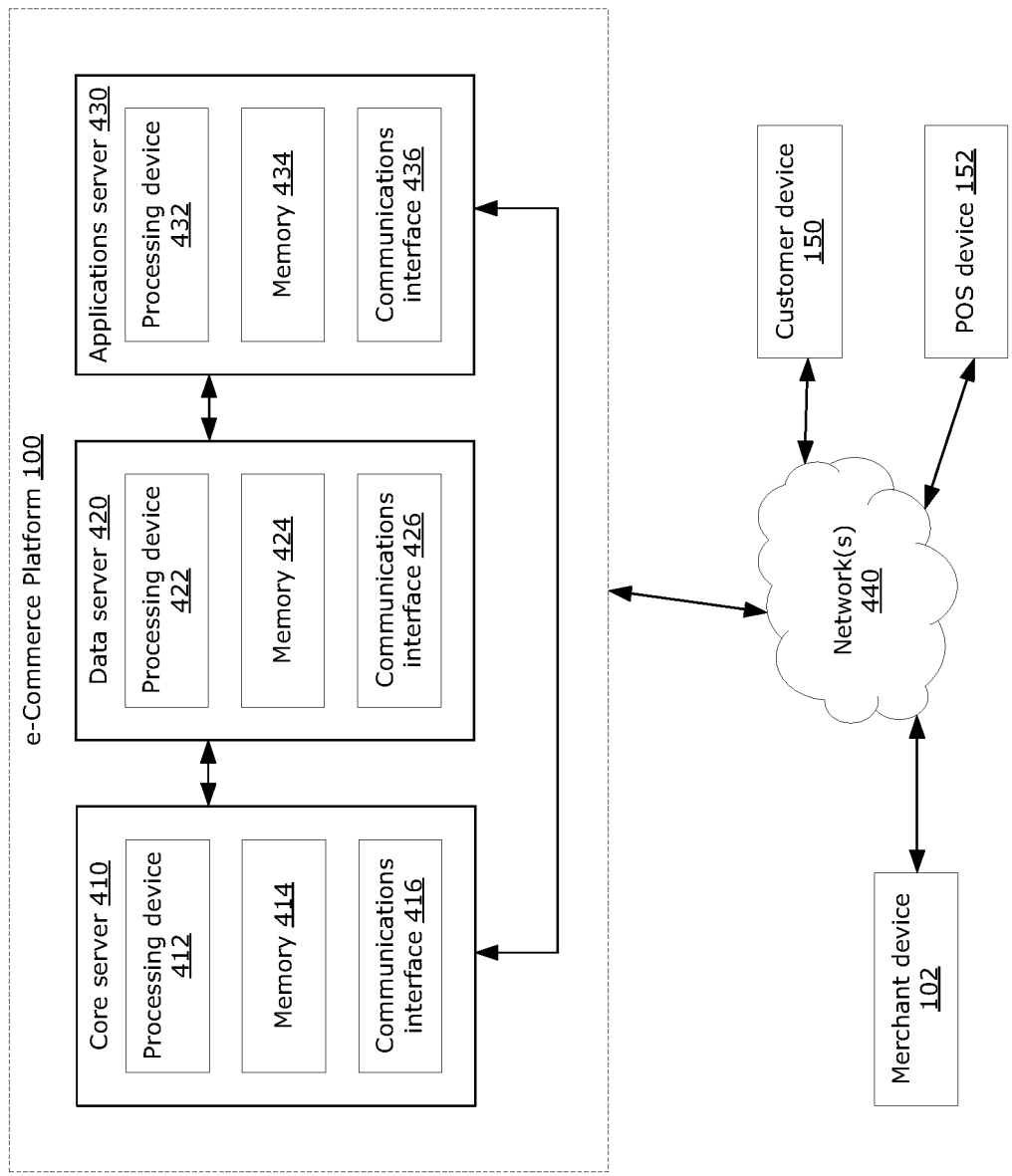
FIG. 4 is a block diagram illustrating an example implementation of the e-commerce platform of FIG. 1.

FIG. 4 is a block diagram of an example hardware configuration of the e-commerce platform 100. It should be noted that different components of the e-commerce platform 100 (e.g., the data facility 134, analytics 132, core commerce facility 136 and applications 142) may be implemented in separate hardware or software components, on a common hardware component or server or configured as a common (integrated) service or engine in the e-commerce platform 100. In the example of FIG. 4, the e-commerce platform 100 includes a core server 410, a data server 420 and an applications server 430, which are each in communication with each other (e.g., via wired connections and/or via wireless intranet connections). Each of the servers 410, 420, 430 include a respective processing device 412, 422, 432 (each of which may be, for example, a microprocessor, graphical processing unit, digital signal processor or other computational element), a respective memory 414, 424, 434 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 416, 426, 436 (each of which may include transmitter, receiver and/or transceiver for wired and/or wireless communications). The core server 410 may store instructions and perform operations relevant to core capabilities of the e-commerce platform, such as providing the administrator 114, analytics 132, core commerce facility 136, services 116 and/or financial facility 130, among others. The data server 420 may be used to implement the data facility 134, among others. The applications server 430 may store instructions and perform operations relevant to the applications 142, such as storing instructions and data for the applications 142 and for implementing application development support 128.

Merchants and customers, using respective devices 102, 150, 152 may access the e-commerce platform 100 via one or more networks 440 (e.g., wired and/or wireless networks, including a virtual private network (VPN), the Internet, and the like).

Although FIG. 4 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 414, 424, 434 may be replaced with external storage or cloud-based storage, among other possible modifications.

Figure 5:
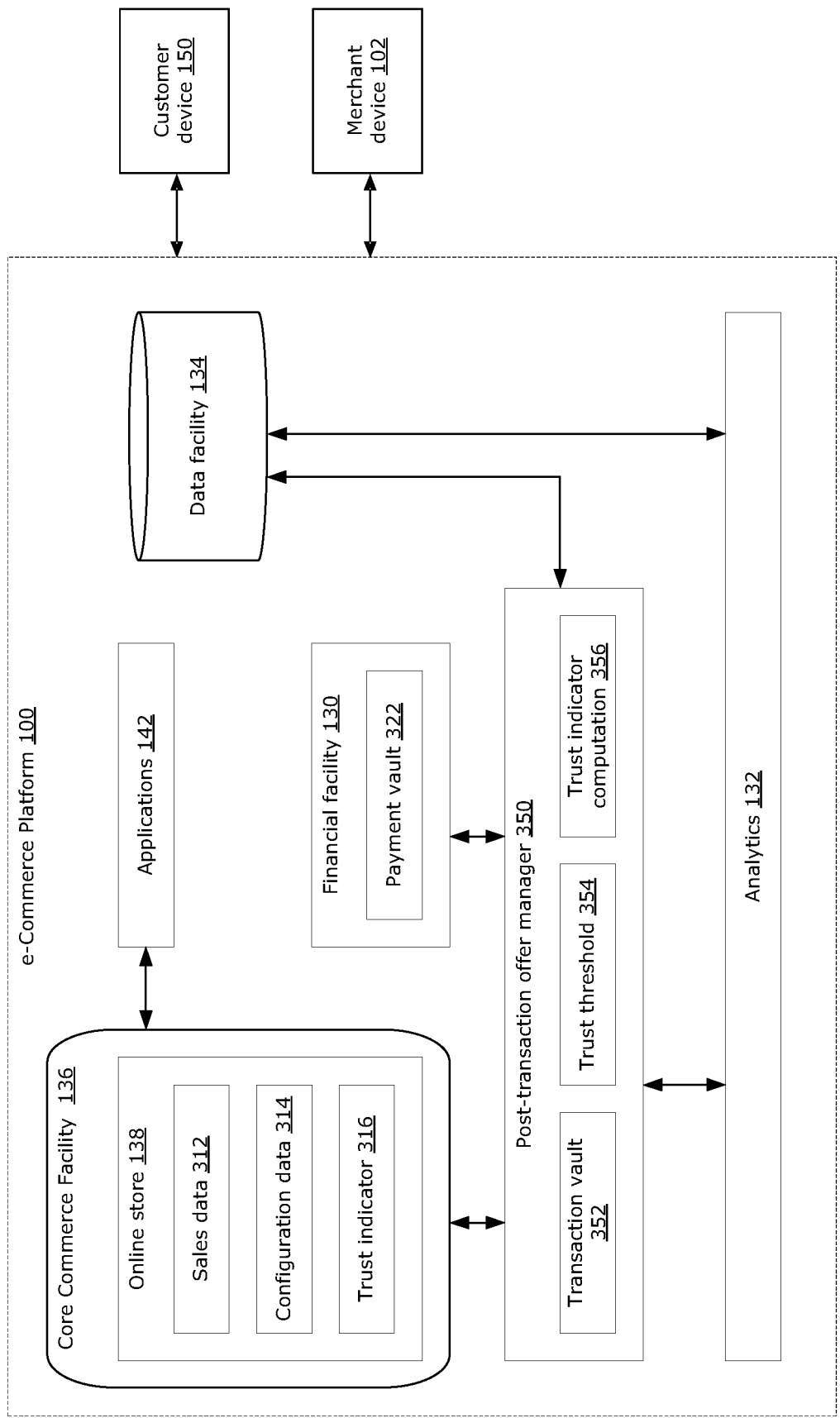
FIG. 5 is another block diagram of the e-commerce platform of FIG. 1, showing some details related to managing post-transaction offers.

FIG. 5 is another depiction of the e-commerce platform 100 that omits some details that have been described with reference to FIG. 1, and shows further details discussed below. In particular, FIG. 5 illustrates some example details of the e-commerce platform 100 that are relevant to managing and selectively providing post-transaction offers.

FIG. 5 illustrates a single instance of an online store 138 for simplicity; however, it should be understood that there may be multiple online stores 138 on the e-commerce platform 100. The online store 138 is associated with a set of sales data 312, a set of configuration data 314, and at least one trust indicator 316. Sales data 312 includes information related to transactions on the online store 138. Sales data 312 may include, for example, sales statistics (e.g., daily sales, monthly sales, etc.), conversion statistics (e.g., number of sales per visit, number of completed transactions per cart, etc.), and refund statistics (e.g., number of returned products per each product sold), among other possibilities. Configuration data 314 includes information related to how the online store 138 is set up. Configuration data 314 may include, for example, product pages, enabled functionalities, and installed applications, among other possibilities. In particular, the configuration data 314 associated with an online store 138 may include information for providing a post-transaction offer, as discussed further below. The trust indicator 316 (also referred to as a trust score) may be used by the e-commerce platform 100 to manage post-transaction offers associated with the online store 138, as discussed further below.

In this example, the e-commerce platform 100 includes a post-transaction offer manager 350 that is configured to manage post-transaction offers associated with the online store 138. In particular, the post-transaction offer manager 350 enables the e-commerce platform 100 to selectively provide post-transaction offers based on the trust indicator 316 associated with the online store 138.

In the present disclosure, a post-transaction offer is any offer that is provided to a customer following completion of a first transaction (e.g., purchase of one or more products) at an online store, but is provided as part of the transaction process (also referred to as the checkout process). For example, a post-transaction offer may be provided on a last page (e.g., a thank you page) of the transaction process or may be provided on an interstitial page preceding (e.g., immediately before) the last page (e.g., between the transaction confirmation page and the thank you page). A post-transaction offer may be an advertisement (e.g., an advertisement for other products sold by the online store 138, or other related online stores), a communication of some information (e.g., information about the online store 138 or other products), a cross-sell offer (e.g., an opportunity to purchase another product that is related to the product(s) purchased in the first transaction), an up-sell offer (e.g., an opportunity to purchase an upgraded version of a product purchased in the first transaction), a subscription offer (e.g., an opportunity to purchase subscription-based products related to the product(s) purchased in the first transaction), or an opt-in communication offer (e.g., an opportunity to opt-in to receiving future communications from the online store), among other possibilities. In some examples, a post-transaction offer may include one or more options for customizing a product that was purchased in the just-completed transaction (e.g., after completing a purchase of a chair, a post-transaction offer may be provided to allow the customer to customize the color of the chair).

In some examples, it may be advantageous to offer options for customizing a product as part of a post-transaction offer, after that product has been purchased (e.g., instead of offering customization options during selection of the product, as is commonly the case). Doing so may help to ensure that computing resources (e.g., memory resources, processing power, etc.) are being used to display and process options, and to manage details of the transaction only after the purchase has been finalized. Providing customization options earlier in the transaction process (e.g., during product selection, but before completion of a purchase) may result in a waste of computing resources if the transaction is abandoned partway (e.g., the purchase is not completed despite customization options having been processed). Further, providing customization options earlier in the transaction process may be confusing or time-consuming for a customer who might not understand whether or not the purchase has been completed.

A post-transaction offer may be provided as a data object that is inserted into the transaction process that is provided by the e-commerce platform 100. In some examples, a merchant may configure their online store 138 to provide post-transaction offers by installing an application 142 (e.g., the configuration data 314 may include information about a third-party plugin used to provide the post-transaction offers). A merchant may also configure how post-transaction offers are presented on their online store 138, for example by selecting different presentation formats (e.g., standalone page, inserted into thank you page, font size, font color, inclusion of images, display size, etc.).

An example transaction process is now described. The transaction process may at least party involve operations provided by the financial facility 130 and the core commerce facility 136. For example, the financial facility 130 may perform operations to enable processing of a credit card in order to complete a transaction (e.g., a purchase of a product on the online store 138). A transaction may be considered to be completed when payment has been successfully processed and an order has been created. A order is a contract of sale between the online store 138 and the customer where the merchant agrees to provide the goods and services listed on the order (e.g., order line items, shipping line items, and the like) and the customer agrees to provide payment (including taxes). After an order is created, an order confirmation notification may be sent to the customer and an order placed notification may be sent to the merchant associated with the online store 138. The merchant may then view and fulfill (or cancel) the order. An order for which the payment has been successfully processed may be indicated as a paid order.

The transaction process may be presented to the customer as a sequence of pages that the customer must navigate through. For example, the transaction process may provide the customer with a page to review a first transaction (e.g., one or more products to be purchased), a page to provide payment information (e.g., credit card information), a page to provide shipping information, a page to confirm the first transaction, and a final page (e.g., a thank you page, or a return to the home page of the online store 138). The last page is provided only after the first transaction is complete and an order has been created. Information for the first transaction (e.g., shipping information, order number) may be stored (e.g., temporarily stored) in a transaction vault 352 managed by the post-transaction offer manager 350. The transaction information may include payment information. For security purposes, payment information for the first transaction may be separately stored (e.g., temporarily stored) in a secure payment vault 322 at the financial facility 130 and cross-referenced to the other less sensitive transaction information (e.g., shipping information) stored in the transaction vault 352. The stored payment information may include, for example, credit card information, or a secure token (e.g., a digital encrypted token) that is used to access credit card information (e.g., in examples where credit card information is stored by a third party). The stored transaction information (including the stored payment information) may be purged from the transaction vault 352 and the payment vault 322, after a set period of time (e.g., one hour) after completion of the first transaction. In other examples, there may not be separate transaction vault 352 and payment vault 322, and all transaction information (including payment information) associated with the first transaction may be temporarily stored in the same vault.

A post-transaction offer may be provided at any point between completion of a first transaction and providing the final page (and may be provided on the final page itself), as part of the transaction process for the first transaction. A customer may view the post-transaction offer and may accept the post-transaction offer, for example by clicking on a link to make an additional purchase promoted by the post-transaction offer. Accepting a post-transaction offer may result in a second transaction. The second transaction may be automatically completed using the transaction information (including the payment information) stored in the transaction vault 352 and payment vault 322. The post-transaction offer may thus be completed as a one-step (or "one-click") process.

From the customer's point of view, this is convenient because the customer does not have to re-enter the same transaction information (e.g., shipping information, payment information) that was previously entered for the first transaction. Further, the second transaction may be added as an additional order line item to the order that was created for the first transaction. Thus, the customer can conveniently review all transactions that were made in the transaction process in a single order. Such increased convenience helps to increase the likelihood that the customer will have a positive response to the post-transaction offer.

From the merchant's point of view, by grouping the second transaction into the same order as the first transaction, both the first transaction and the second transaction may be fulfilled as a single order by the merchant. This helps to simplify merchant operations (e.g., tracking fulfillment, preparing shipments, etc.).

For the e-commerce platform, the reuse of the same transaction information for the second transaction (e.g., reuse of the same digital token for accessing the customer's financial information), and the grouping of the second transaction into the same order as the first transaction may result in more efficient use of computing resources (e.g., memory resources and/or processing resources).

As previously mentioned, although post-transaction offers are attractive to merchants, there is also a risk that post-transactions offers can negatively impact a customer's experience with the online store 138 (and possibility with the e-commerce platform 100 more generally). Therefore, there may be a tradeoff between optimizing a merchant's experience on the e-commerce platform 100 and a customer's experience on the e-commerce platform 100. The post-transaction manager 350 helps to address this challenge by using information about a customer's response to post-transaction offers at an online store 138 to determine the trust indicator 316 for the online store 138. A trust indicator 316 may, for example, be calculated using a weighted aggregation of customer response data, as discussed further below. The trust indicator 316 can be compared against a defined criteria, such as a trust threshold 354 at the post-transaction offer manager 350, to automatically and dynamically control whether future post-transaction offers should be permitted at the online store 138. The trust indicator 316 may be a metric or label that is associated with the online store 138, and that represents the positivity (or negativity) of customers' responses to post-transaction offers provided by the online store 138. The trust threshold 354 may be a minimum (or maximum) threshold value that the trust indicator 316 must satisfy in order for the online store 138 to be permitted to provide post-transaction offers to its customers. Although the present disclosure makes reference to a trust indicator 316 and a trust threshold 354, it should be understood that the trust indicator 316 and the trust threshold 354 need not be strictly or only limited to metrics representing customers' "trust". More generally, the trust indicator 316 and the trust threshold 354 should be understood as being related to quantification of how providing (or not providing) a post-transaction offer impacts a customer's interactions with the online store 138 (and with the e-commerce platform 100 overall). For example, by extracting data about how customers have interacted with online stores 138 historically after being presented with a post-transaction offer, a trust indicator 316 can be computed to quantify the relationship between the post-transaction offer and the customers' interactions, and to quantify the benefit of presenting a future post-transaction offer. Thus, the trust indicator 316 may represent not only the customers' trust in checkout process, but may also represent the value of presenting a post-transaction offer, both in terms of value to the customer as well as value to the online store 138 and/or e-commerce platform 100.

The trust indicator 316 is a dynamic indicator, which can change rapidly (e.g., in real-time or near real-time) as customers interact with post-transaction offers provided by the online store 138 (or other online stores on the e-commerce platform 100, as discussed further below). In the present disclosure, "near real-time" refers to an occurrence that takes place within a time period that may be perceived by a human as instantaneous or nearly instantaneous with a real-time occurrence (e.g., within one second, or within several 100 milliseconds of a real-time occurrence).

Although FIG. 5 illustrates a single trust indicator 316 at the online store 138 and a single trust threshold 354 at the post-transaction offer manager 350, it will be understood (as discussed further below) that there may be multiple trust indicators 316 associated with a single online store 138 and/or multiple trust thresholds 354 at the post-transaction offer manager 350. For example, there may be multiple trust indicators 316 associated with the online store that each represent customer responses from a respective customers group, where a customer group may be defined by a common characteristic shared by all customers in the customer group (e.g., customer groups may be defined by age groups, and there may be different trust indicators 316 representing customer responses from customers belonging to different age groups).

Similarly, there may be multiple trust thresholds 354 that are each defined for a respective customer group. A trust threshold 354 defined for a specific customer group must be satisfied before the online store 138 can provide a post-transaction offer to a customer belonging to that specific customer group. In this way, management of post-transaction offers can be more finely tuned, so that post-transaction offers can be provided to as many customers as possible while reducing negative customer responses as much as possible.

The post-transaction offer manager 350 may have access to information from the analytics 132 and data facility 134 of the e-commerce platform 100. The analytics 132 and data facility 134 may include, for example, information about customers (e.g., stored in customer profiles), information about customers' purchase habits (e.g., purchase information aggregated by customer group, aggregated by time period, etc.), information about customers' browsing habits (e.g., browsing information aggregated by customer group, aggregated by time period, etc.), information about sales (e.g., sales information aggregated by product category, aggregated by time period, aggregated by geography, etc.), among others. Information about customers may be used to define customer groups. For example, a customer group may be defined by a common characteristic such as a common gender, a common age group, a common geographic area, a common living arrangement, a common purchase history, a common browsing history, a common interest (whether explicitly indicated in a customer profile or implicitly indicated in purchase or browsing history), and combinations thereof, among other possibilities.

The post-transaction offer manager 350 includes a trust indicator computation module 356 that uses data from the analytics 132 and data facility 134 (and optionally also data extracted by the post-transaction offer manager 350) to compute the trust indicator 316. For example, the trust indicator computation module 356 may implement a machine-learning algorithm such as a regression neural network to infer the correlation between presenting a post-transaction offer and how a customer interacts with an online store 138 or e-commerce platform 100 in a defined time period (e.g., a week, or a month) following presentation of the post-transaction offer. The regression neural network may additionally or alternatively infer the correlation between how a customer responds to a post-transaction offer and the positivity or negativity of the customer's experience. The generated inference data thus indicates not only the strength of correlation between the post-transaction offer at the online store 138 and the following customer interaction (or response), but also indicates the positivity or negativity of the customer interaction (or response). On the basis of this inference data, the trust indicator 316 may be computed, as discussed in some examples below.

Since the analytics 132 and data facility 134 of the e-commerce platform 100 can collect data from multiple online stores 138 and customers on the e-commerce platform 100, this enables the trust indicator computation module 356 to compute the trust indicator based on customer responses to all post-transaction offers on a global level. Customer responses to post-transaction offers at a given online store 138 may be used by the trust indicator computation module 356 to compute the trust indicator 316 for the given online store 138. For example, if customers have a large negative response to a post-transaction offer (e.g., many customers submit complaints about the post-transaction offer) provided at the given online store 138, then the trust indicator computation module 356 may compute a low trust indicator 316 for the given online store 138. Further, other online stores 138 belonging to the same category as the given online store 138 (e.g., selling the same category of products) may also be automatically assigned a similarly low trust indicator 316. Thus, the post-transaction offer manager 350 may use customer responses across multiple online stores 138 (or all online stores 138) on the e-commerce platform 100 in order to estimate or predict the trust indicator 316 for each online store 138.

The post-transaction offer manager 350 may extract data from various customer responses on the e-commerce platform 100 to compute the trust indicator 316. For example, the trust indicator 316 associated with a given online store 138 may be determined based on: historical customer responses to any post-transaction offers by the given online store 138; historical customer response to any post-transaction offers by other online stores 138 having a characteristic in common with the given online store 138 (e.g., selling the same category of products, selling to the same geographic location, having a similar level of experience, having a similar inventory size, etc.); historical customer response to the same post-transaction offer other online stores 138 (e.g., other online stores 138 may use the same third-party application to provide post-transaction offers); historical customer response to any post-transaction offers having a common offer characteristic (e.g., having a similar type of promotion, having a similar monetary value, having a similar presentation format, etc.); or historical customer responses from customers belonging to the same customer group (e.g., customer responses from customers having a common customer characteristic); among other possibilities.

The post-transaction offer manager 350 may extract various types of data to analyze historical customer response and compute the trust indicator 316. Some examples of the types of data that may be analyzed by the trust indicator computation module 356 may include data extracted during the transaction process such as: conversion rate from a post-transaction offer page to the last page (e.g., thank you page) of the transaction process (e.g., if a high number of customers fail to reach the last page, this may indicate a strong negative response to the post-transaction offer page); rate of customer help request (e.g., selection of a help option on a post-transaction offer page; viewing a help page about post-transaction offer; sending a communication to an online store 138 to check if the transaction was successful; sending a communication to a help facility of the e-commerce platform 100 to question the post-transaction offer; etc.) when a post-transaction offer is provided (e.g., if customers request help when the post-transaction offer is provided, this may indicate customer confusion which may be a strong negative response); conversion rate of the post-transaction offer (e.g., if a high percentage of customers (e.g., over 2% or over 5%) accept the post-transaction offer, this may indicate a positive customer response); or a decline rate (e.g., if a customer views the post-transaction offer page for less than one second, or a customer does not accept the post-transaction offer, this may indicate a slightly negative response); among other possibilities. Such data may be extracted in real-time (or near real-time) during the transaction process.

For example, the post-transaction offer manager 350 may use a tracking mechanism (e.g., a cookie, browser fingerprint, etc.) to obtain data about the conversion rate from the post-transaction offer page to the last page of the transaction process, about the decline rate, or about the help request rate. In another example, the post-transaction offer manager 350 may use natural language processing (NLP) or chatbot algorithms to extract data about the number (or rate) of help requests (e.g., communicated to a help chatbot provided by the e-commerce platform 100, or communicated in an email request to the e-commerce platform 100 or to the online store 138) related to the post-transaction offer.

The trust indicator computation module 356 may also analyze data that is extracted after the transaction process (e.g., after the customer has viewed and left the last page of the transaction) to determine the historical customer response. Some examples of post-transaction data that may be analyzed by the trust indicator computation module 356 may include: a chargeback or refund rate when a post-transaction offer is provided (e.g., a high refund rate may indicate that that customers responded negatively to the post-transaction offer); amount of order refunded (e.g., if customers refunded only the post-transaction offer, this may indicate a negative customer response to the post-transaction offer); browsing activity related to the post-transaction offer (e.g., if a customer browses a review or product page related to the post-transaction offer, this may indicate a positive customer response); customer trends after a post-transaction offer has been provided by an online store 138 (e.g., repeat purchases or visits to the same online store 138, which may indicate a slightly positive customer response to a post-transaction offer; repeat purchases or visits to other online stores 138 hosted by the e-commerce platform, which may indicate a slightly positive customer response to a post-transaction offer; etc.); or solicited or unsolicited customer reviews related to a post-transaction offer (e.g., positive or negative reviews containing keywords about the post-transaction offer); among other possibilities.

For example, the post-transaction offer manager 350 may use a tracking mechanism (e.g., a cookie, browser fingerprint, etc.) to obtain data about the customer's browsing activity following presentation of a post-transaction offer, to identify whether the customer browses a review or product page related to the post-transaction offer. In another example, the post-transaction offer manager 350 may use NLP or keyword parsing algorithms to extract data, from online text and/or video reviews, indicating positive or negative reviews related to the post-transaction offer. In some examples, a customer may express their experience with a post-transaction offer on another platform (e.g., social media platform, blogging or vlogging platform, etc.) that is external to the e-commerce platform 100, and the post-transaction offer manager 350 may use automated bots (e.g., web crawlers, data scrapers, etc.) to extract data indicating positive or negative reviews related to the post-transaction offer from the external platform.

Customer response data can be aggregated over all forms of extracted data, to compute an overall trust indicator 316 for the online store 138. The trust indicator computation module 356 may analyze the customer response data by aggregating the data according to various categories, such as: aggregating by third-party application (e.g., if there are different third-party applications that are used by different online stores 138 to provide post-transaction offers); aggregating by individual customer (e.g., a customer identifier or a shipping address may be used to track responses of a given customer to post-transaction offers at different online stores 138); aggregating by customer group (e.g., based on a common customer characteristic such as age group, geographic region, customer history with the e-commerce platform 100, or customer loyalty history with a given online store 138, among other possibilities); aggregating by individual online store 138; aggregating by category of online store 138 (e.g., based on a common store characteristic such as product category, store history with the e-commerce platform 100, or volume of sales, among other possibilities); aggregating by offer category (e.g., based on a common offer characteristic such as monetary amount of offer, type of offer (e.g., up-sell vs. cross-sell), or presentation format (e.g., text-only vs. graphics included), among other possibilities).

The trust indicator computation module 356 may weigh customer response data based on how strongly a response is correlated with a positive or negative customer experience. For example, as discussed above, the trust indicator computation module 356 may implement a regression neural network to infer a weight representing the correlation between a customer response and the positivity or negativity of the customer experience. Positivity or negativity of the customer experience may be determined based on positive user interactions (e.g., returning to the same online store 138, returning to other online stores 138 on the e-commerce platform 100, accepting the post-transaction offer, posting a positive review, etc.) and negative user interactions (e.g., declining the post-transaction offer, seeking help about the post-transaction offer, refunding a purchase, posting a negative review, etc.) as discussed previously. For example, a customer complaint about post-transaction offers or a customer selecting a help option on the post-transaction offer page may be strongly correlated with a negative customer experience. However, a customer declining a post-transaction offer (e.g., viewing the post-transaction offer page for less than one second or not accepting the post-transaction offer) may only be weakly correlated with a positive customer experience. Accordingly, the trust indicator computation module 356 may assign a large negative weight (e.g., −1.0) to each instance of a customer complaint about a post-transaction offer and may assign a small negative weight (e.g., −0.01) to each instance of a customer declining a post-transaction offer, when aggregating customer response data to determine a trust indicator 316. The weights to be assigned to each type of customer response data may be defined automatically (e.g., using machine learning algorithms, such as a regression neural network) based on how strongly each type of customer response data correlates with a positive or negative customer experience.

An example determination of a trust indicator 316 is now described. It should be understood that this is a simplified example only and is not intended to be limiting. For example, the post-transaction offer manager 350 may track the percentage $p_1$ of customers who select a help option when a post-transaction offer is provided at an online store 138, and assign a large negative weight $w_1$ to this percentage $p_1$. The post-transaction offer manager 350 may also track the percentage $p_2$ of customers who decline the post-transaction offer, and assign a small negative weight $w_2$ to this second percentage. The post-transaction offer manager 350 may also track the percentage $p_3$ of customers who complete the second transaction promoted by the post-transaction offer, and assign a moderately positive weight $w_3$ to this third percentage. Finally, the trust indicator computation module 356 may calculate the trust indicator 316 as follows:

$$\text{trust indicator} = p_1 w_1 + p_2 w_2 + p_3 w_3$$

In some cases, a given type of customer response data may not be clearly correlated with positive or negative customer experience (e.g., dwell time on a post-transaction offer page can indicate customer interest or confusion). Accordingly, the post-transaction offer manager 350 may use some other data to find a positive or negative correlation for a given type of customer response data (e.g., dwell time on the post-transaction offer page). For example, the post-transaction offer manager 350 may use automated algorithms (e.g., machine learning algorithms) to compare sales data at an online store 138 before and after post-transaction offers are implemented at the online store 138, and correlate the positive or negative change in sales with increase or decrease in customer dwell time on the post-transaction offer page. In some examples, in exchange for permission to present post-transaction offers to customers, an online store 138 may permit the post-transaction offer manager 350 to access and extract data about customer habits (e.g., browsing habits, purchase habits, refund habits, etc.) at the online store 138. In particular, the post-transaction offer manager 350 may extract anonymized data about customer habits on the online store 138 over a period of time before and after the online store 138 implemented post-transaction offers and operational data of the online store 138 over the same period of time, and feed this data into a regression neural network to identify a positive or negative correlation. A positive change in sales that is correlated with an increase in customer dwell time on the post-transaction offer page suggests that dwell time on the post-transaction offer page is positively correlated with a positive customer experience. In another example, the post-transaction offer manager 350 may compare sales data between two similar online stores (e.g., selling a similar category of products, having a similar inventory size, etc.) with and without post-transaction offers, and thus determine whether higher or lower dwell time on the post-transaction offer page is correlated to higher or lower sales (and hence more positive or more negative customer experience). In this way, the post-transaction offer manager 350 may determine an appropriate weight to assign to customer dwell time on the post-transaction offer page. The post-transaction offer manager 350 may similarly determine an appropriate weight to assign to other customer response data. It should be appreciated that, since customer response data is tracked in real-time and customer behavior is dynamic, this calculation of the weight to assign to each type of customer response data should also be performed dynamically (or at least updated regularly, such as hourly or daily). Accordingly, it should be recognized that it would not be practically feasible for a human to manually calculate the appropriate weights to assign to each type of customer response data.

The post-transaction offer manager 350 may also apply a defined discount factor to older customer response data, or may aggregate customer response data over a defined moving temporal window (e.g., a one-month moving window), such that the trust indicator 316 reflects up-to-date customer experience.

Although the present disclosure describes the trust indicator 316 being associated with the online store 138, this is not intended to be limiting. For example, if a given third-party application is used to provide post-transaction offers, a trust indicator can be determined, using a similar analysis, for the given third-party application. If the trust indicator associated with the given third-party application fails the trust threshold 354, the post-transaction offer manager 350 may block all post-transaction offers provide using that given third-party application.

The post-transaction offer manager 350 may also analyze data about merchants' experience with post-transaction offers. Such analysis may enable the post-transaction offer manager 350 to determine if merchants have negative responses or positive responses to a given third-party application that is used to provide post-transaction offers. For example, the post-transaction offer manager 350 may analyze solicited or unsolicited feedback (e.g., reviews) about the third-party application. The post-transaction offer manager 350 may also analyze the configuration data 314 across multiple online stores 138 to determine if a high percentage (e.g., over 50% or over 30%) of online stores 138 disables or uninstalls the third-party application (which would be considered negative responses). If there is a high percentage of negative responses to a given third-party application, the post-transaction offer manager 350 may determine that the given third-party application should be blocked, and any future post-transaction offers provided using the given third-party application may also be blocked by the post-transaction offer manager 350.

In some examples, as previously mentioned, the post-transaction offer manager 350 may additionally or alternatively use machine learning-based techniques to analyze customer response data and to determine the trust indicator 316. For example, the post-transaction offer manager 350 may implement a trained regression neural network that has been trained to infer appropriate weights to calculate a weighted aggregation of customer response data, in order to estimate or predict customer response to post-transaction offers.

Although examples have been described in the context of a post-transaction offer being presented as part of a checkout process at an online store 138, it should be understood that the present disclosure is also applicable to post-transaction offers being provided in other contexts. For example, the present disclosure is also applicable to managing post-transaction offers being provided on a POS device (e.g., displayed on the screen of the POS as part of the transaction process, or displayed on a screen of a PIN pad that a customer interacts with to provide payment information, etc.).

Figure 6:
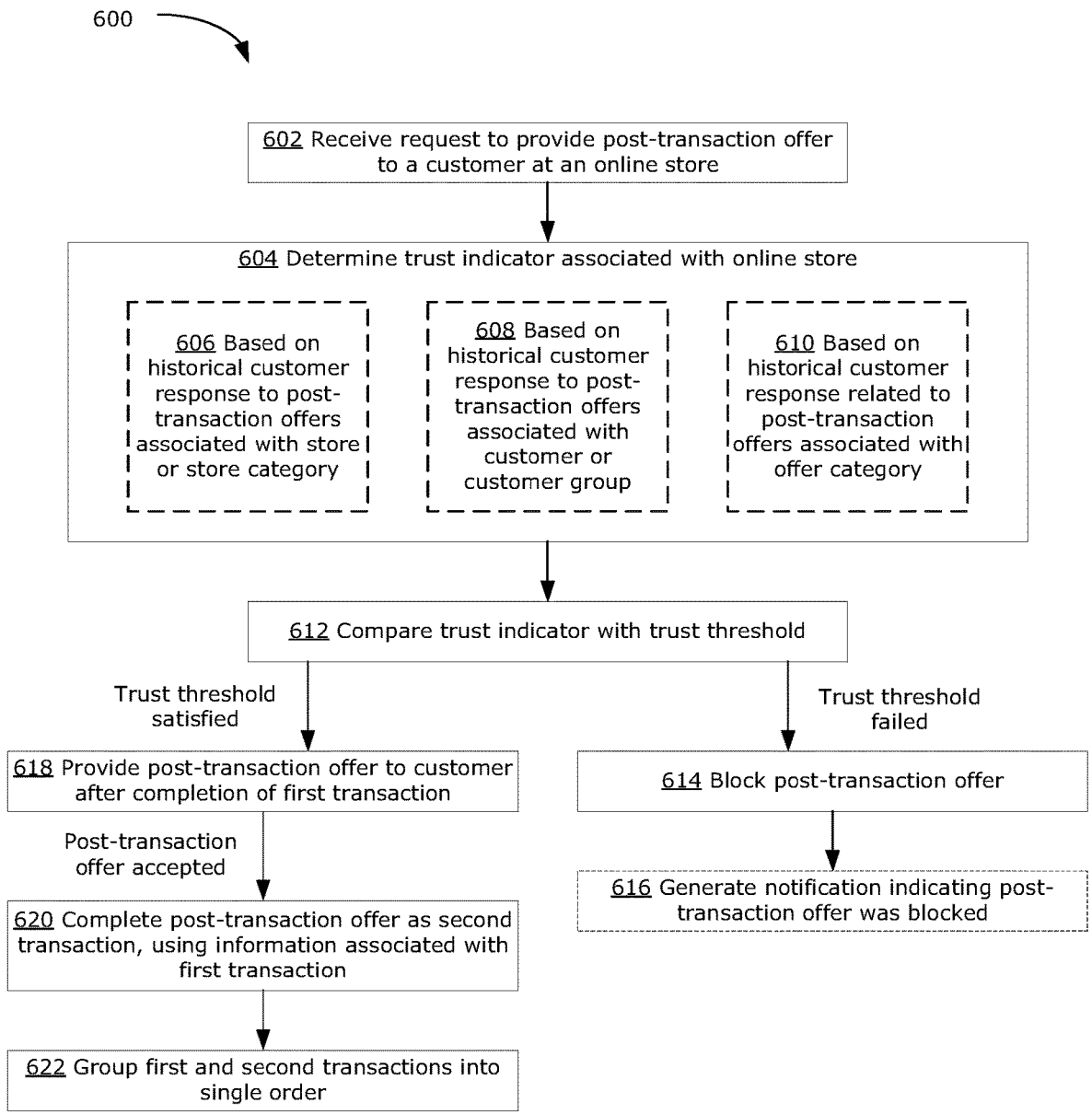
FIG. 6 is a flowchart illustrating an example method for presenting post-transaction offers, which may be implemented using the e-commerce platform of FIG. 1.

FIG. 6 is a flowchart illustrating an example method 600 for selectively providing post-transaction offers. The example method 600 may be performed by the e-commerce platform 100 using the post-transaction offer manager 350, for example. In particular, the method 600 may be performed in real-time (or near real-time) during a transaction process for a first transaction (e.g., a first purchase) at a given online store 138 by a given customer.

At an operation 602, the post-transaction offer manager 350 receives a request to provide a given post-transaction offer to the customer. For example, the request to provide the post-transaction offer may be received from a third-party application (or third-party plugin) that is providing post-transaction offers at the online store 138. It should be noted that the request to provide the post-transaction offer may be received at or only shortly before (e.g., less than one second before, or less than 100 ms before) the time when the post-transaction offer is to be provided. For example, as the customer navigates through the transaction process, the request to provide the post-transaction offer may be received only after the transaction has been completed and immediately before the last page (e.g., thank you page) would otherwise be presented to the customer.

At an operation 604, a trust indicator 316 associated with the online store 138 is determined. As depicted in FIG. 6 through the use of stippled lines, one or more optional operations may be employed, alone or in combination, in order to determine the trust indicator 316 associated with the online store 138. More particularly, as shown in FIG. 6, the trust indicator 316 may be determined at the operation 604 such as, for example, by employing one or more of the operations 606, 608 and/or 610 further described below.

In an example, at an operation 606, the trust indicator 316 may be determined based on historical customer response to post-transaction offers, where the customer response is associated with the given online store 138 and/or associated with the store category of the given online store 138. For example, the trust indicator 316 may be determined based on how positively or negatively customers have historically (e.g., in the past month, in the past week, or in the past 24 hours, among other possibilities) responded to prior post-transaction offers provided at the given online store 138. In another example, the trust indicator 316 may be determined based on how positively or negatively customers have historically responded to prior post-transaction offers provided at multiple (or all) online stores 138 on the e-commerce platform 100 that share a common characteristic with the given online store 138 (e.g., selling a common category of products, having operated on the e-commerce platform 100 for the same approximate amount of time, etc.).

In another example, at an operation 608, the trust indicator 316 may be determined based on historical customer response to post-transaction offers, where the customer response is associated with the given customer and/or associated with the customer group to which the given customer belongs. For example, the trust indicator 316 may be determined based on how positively or negatively the given customer has responded historically (e.g., in the past month, in the past week, or in the past 24 hours, among other possibilities) to prior post-transaction offers provided by any online store 138 on the e-commerce platform 100. In another example, the post-transaction offer manager 350 may identify a customer group to which the given customer belongs (e.g., a customer group defined by a common customer characteristic such as a common age group, a common geographic region, a common level of experience navigating online stores, etc.). The trust indicator 316 may then be determined based on how positively or negatively multiple (or all) customers in the customer group have historically responded to prior post-transaction offers provided at online stores 138 on the e-commerce platform 100.

In another example, at an operation 610, the trust indicator 316 may be determined based on historical customer response to post-transaction offers, where the customer response is associated with the given post-transaction offer that is intended to be provided to the given customer and/or associated with an offer category to which the post-transaction offer belongs. For example, the trust indicator 316 may be determined based on how positive or negatively customers have responded historically (e.g., in the past month, in the past week, or in the past 24 hours, among other possibilities) to prior instances at which the given post-transaction offer has been provided (e.g., at the given online store 138 as well as at other online stores 138). In another example, the trust indicator 316 may be determined based on how positively or negatively customers have historically responded to prior post-transaction offers that share a common characteristic with the given post-transaction offer (e.g., offering a common type of offer, having monetary value in a common range, having a common presentation format, etc.).

Example operations 606, 608, 610 illustrate some techniques by which the post-transaction offer manager 350 may determine the trust indicator 316 associated with the online store 138. The operations 606, 608, 610 may be performed separately or in combination. For example, the trust indicator 316 may be determined based how a customer group responds to post-transaction offers provided at the given online store 138 (e.g., by combining operations 606 and 608). It should be understood that other techniques may be used, in addition to or instead of the operations 606, 608, 610. As previously mentioned, calculation of the trust indicator 316 may be at least partly using machine-learning algorithms (e.g., regression neural network) that are trained to infer positive or negative patterns of customer responses to post-transaction offers. In some examples, the trust indicator 316 may be determined based on other performance goals, such as optimization of expected long-term customer value (e.g., optimization of return customers, optimization of future customer engagement, etc.).

However the operation 604 is implemented, following the operation 604, an operation 612 is performed.

At an operation 612, after determining the trust indicator 316 associated with the online store 138, the post-transaction offer manager 350 compares the trust indicator 316 with the trust threshold 354. The post-transaction offer manager 350 determines whether the trust indicator 316 associated with the online store 138 satisfies the trust threshold 354 (e.g., meets or exceeds a minimum value defined by the trust threshold 354, is within a maximum value defined by the trust threshold 354, or falls within a trust range defined by the trust threshold 354, among other possibilities). If it is determined that the trust indicator 316 fails the trust threshold 354, the method 600 proceeds to an operation 614.

At an operation 614, responsive to determining that the trust indicator 316 fails the trust threshold, the request to provide the post-transaction offer is denied and the post-transaction offer is blocked from being provided to the customer at the online store 138.

At an optional operation 616, a notification may be generated indicating that the post-transaction offer was blocked. For example, the post-transaction offer manager 350 may generate a notification that is communicated to the online store 138 (or to a merchant of the online store 138). A notification that the post-transaction offer was blocked may, for example, be provided via a homepage of an administrator 170 for managing the online store 138. The notification may include information to enable the merchant to modify the post-transaction offer (or switch to a different third-party application for providing the post-transaction offer) to avoid being blocked in the future. For example, the notification may include a reason why the post-transaction offer was blocked (e.g., due to high negative customer response, due to high number of customer complaints, due to being flagged as possible spam, etc.). The method 600 may then end.

Returning to the operation 612, if it is determined that the trust indicator 316 satisfies the trust threshold 354, the method 600 proceeds to an operation 618.

At an operation 618, responsive to determining that the trust indicator 316 satisfies the trust threshold, the request to provide the post-transaction offer is approved and the post-transaction offer is provided to the customer at the online store 138. As previously noted, the post-transaction offer is provided as part of the transaction process for a first transaction (e.g., a first purchase) by the customer on the online store 138. At the operation 618, the post-transaction offer is provided after the first transaction has been completed (e.g., the payment for the first transaction has been successfully processed) but before the customer leaves the transaction process (e.g., on or before the last page of the transaction process). The post-transaction offer may be provided as a standalone interstitial page that is inserted in the transaction process immediately before the last page, or may be provided on the last page of the transaction process, among other possibilities. The post-transaction offer may be provided in a variety of manner, some of which will be discussed further below.

The customer may accept the post-transaction offer (e.g., by clicking on a link or a button provided by the post-transaction offer), or may decline the post-transaction offer (e.g., by ignoring the post-transaction offer and navigating to another page, or by clicking on a decline link or button provided by the post-transaction offer). If the post-transaction offer is declined, the method 600 may end. If the post-transaction offer is accepted, the method 600 proceeds to an operation 620.

At an operation 620, responsive to receiving an indicator that the post-transaction offer was accepted (e.g., receiving an electronic signal indicating that the link or button included in the post-transaction offer was selected by the customer), the post-transaction offer is completed as a second transaction. In particular, the second transaction is completed using information that is associated with the first transaction. For example, as discussed above, the first transaction may be completed using transaction information (e.g., including payment information (such as a digital token to access credit card information) and shipping information) that may be stored in the payment vault 322 and/or transaction vault 352. In some examples, transaction information for the first transaction may be temporarily stored for a defined period of time (e.g., one hour, 30 minutes, etc.) during which the second transaction may be completed using the stored information, without requiring the customer to re-enter the transaction information. Because the first transaction was successfully completed using the same transaction information, it is expected that the second transaction will also be successfully completed without requiring any further information from the customer.

At an operation 622, the completed first and second transactions are grouped together into a single order. For example, after the first transaction was initially completed (i.e., before the post-transaction offer is provided at the operation 618), an order with a unique order number may be created for the first transaction. An order edit operation may be performed to add the second transaction to the same order. The method 600 may end.

The order containing both the first and second transactions may be fulfilled as a single order by the merchant. This may help to simplify fulfillment operations at the merchant, and may help to decrease costs to the merchant and/or customer (e.g., decrease packaging costs, decrease shipping costs, etc.). There may also be environmental benefits because the first and second transactions can be packaged and shipped together, thus reducing waste and reducing the overall carbon footprint. Further, grouping the first and second transactions into a single order may result in more efficient use of resources at the e-commerce platform 100, because there is no need to track fulfillment statistics (and optionally general notifications or warnings) on two separate orders.

It should be noted that at least some operations of the method 600 are performed in real-time (or near real-time) during the transaction process. In particular, the trust indicator 316 is determined in real-time (or near real-time), when the post-transaction offer is intended to be provided to the customer. The trust indicator 316 is thus determined dynamically, rather than being static or predetermined. The real-time (or near real-time) determination means that the trust indicator 316 is able to account for a variety of different specific factors, such as taking into consideration the specific customer who is the intended target of the post-transaction offer (e.g., whether the customer has previously responded positively to post-transaction offers, whether the customer belongs to a demographic group that mostly responds positively to post-transaction offers, etc.), and taking into consideration the online store 138 providing the post-transaction offer (e.g., whether other customers have previously responded positively to post-transaction offers from the online store 138, etc.). The trust indicator 316 is thus a dynamic and finely tuned indicator that can be used by the e-commerce platform 100 to determine whether a post-transaction offer should be permitted or blocked for the specific customer at the specific online store 138.

It should be appreciated that the operations to determine the trust indicator 316 and to determine whether or not the post-transaction offer should be provided (by comparing the trust indicator 316 against the trust threshold 354) should be performed in real-time or near real-time, to ensure a positive customer experience. For example, determining the trust indicator 316 and determining to provide (or not provide) the post-transaction offer should add negligible delay (e.g., a time delay of no more than a few 100 ms or no more than one second) between the time a customer completes the first transaction and the time the customer is provided with the post-transaction offer (or the time the customer is provided with the last page of the transaction process, in the case where the post-transaction offer is blocked). In this way, the e-commerce platform 100 can avoid the waste of computing resources to provide post-transaction offers to customers who are likely to respond negatively to such offers. The e-commerce platform 100 can proactively manage post-transaction offers to more efficiently serve the many online stores 138 on the platform 100. For example, it can be appreciated that when many online stores 138 have installed third-party applications to provide post-transaction offers, there can be significant waste of resources on the e-commerce platform 100 if a non-trivial portion (e.g., 10%) of post-transaction offers that are provided elicit negative responses from customers. On the other hand, it may not be desirable for the e-commerce platform 100 to indiscriminately block post-transaction offers, due to the loss of potential selling opportunities. The present disclosure provides an approach that dynamically manages post-transaction offers in real-time (or near real-time), to enable the e-commerce platform 100 to optimize usage of its resources, tailored to each specific case.

Figure 7:
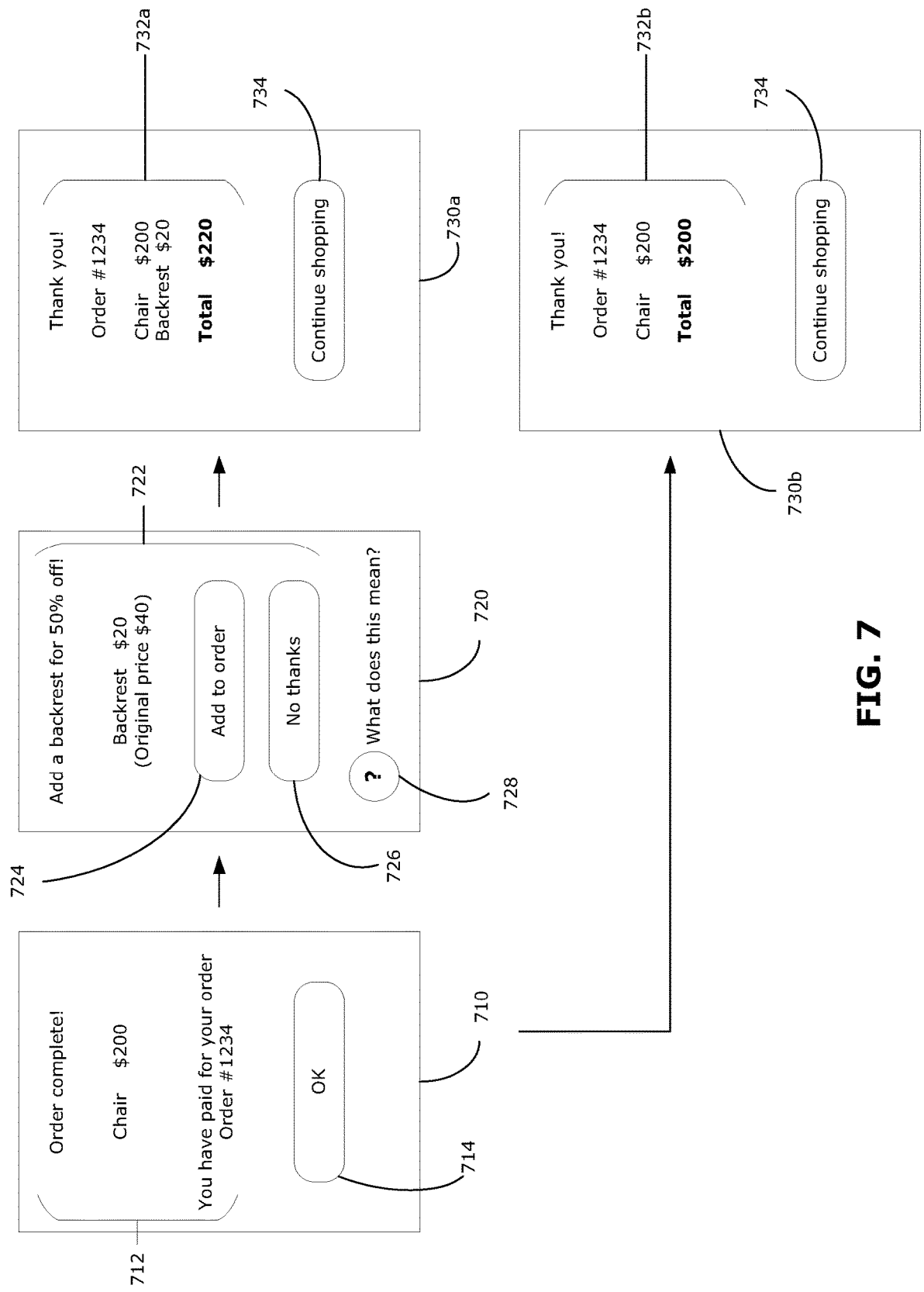
FIG. 7 illustrates a simplified example implementation of the example method of FIG. 6.

FIG. 7 illustrates a simplified example implementation of the example method 600. In particular, FIG. 7 illustrates a simplified transaction complete page 710, a simplified post-transaction offer page 720 and a simplified thank you page 730a or 730b, which may be presented to a customer during a transaction process (also referred to as a checkout process) at an online store 138.

The transaction complete page 710 is presented after a first transaction is completed. The transaction complete page 710 may include information 712 about the first transaction, such as product(s) purchased in the first transaction and the order number that has been created for the first transaction. The transaction complete page 710 also confirms to the customer that the first transaction was successfully completed. The transaction complete page 710 includes a selectable option 714 (e.g., an "OK" button) that the customer can select to proceed to the next page in the transaction process.

In this example, the online store 138 has enabled a functionality (e.g., installed a third-party application) to provide post-transaction offers to customers. Instead of presenting a thank you page immediately following the transaction complete page 710, the e-commerce platform 100 performs operations (e.g., the operations 602-612 of the method 600) to determine in real-time (or near real-time) whether the online store 138 is permitted to provide a post-transaction offer the customer.

The e-commerce platform 100 may determine that the post-transaction offer should be provided, in which case the e-commerce platform 100 performs operations (e.g., the operation 618 of the method 600) to provide the post-transaction offer. In this example, the post-transaction offer 722 is provided via the post-transaction offer page 720 that is inserted immediately before a thank you page. The post-transaction offer 722 may include promotional language, as well as information about the product being offered, for example. The post-transaction offer 722 also includes a selectable option 724 (e.g., an "Add to order" button) that the customer can select to accept the post-transaction offer, and another selectable option 726 (e.g., a "No thanks" button) that the customer can select to decline the post-transaction offer. Selection of the accept option 724 may be detected as a positive customer response to the post-transaction offer 722, and selection of the decline option 726 may be detected as a negative customer response to the post-transaction offer 722, both of which can be used as customer response data for future determination of the trust indicator 316. The post-transaction offer page 720 also includes a help option 728 that the customer can select to get more information about the post-transaction offer 722. Selection of the help option 728 may be detected as a negative customer response to the post-transaction offer 722, because selection of the help option 728 may indicate that the customer found the post-transaction offer 722 to be confusing or intrusive.

In this example, the customer selects the accept option 724. The selection to accept the post-transaction offer 722 is detected by the e-commerce platform 100. The e-commerce platform 100 performs operations (e.g., the operations 620-622 of the method 600) to complete the post-transaction offer as a second transaction, using transaction information (e.g., payment information and shipping information) associated with the just-completed first transaction.

The customer is then presented with the thank you page 730a, which may include information 732a indicating that the post-transaction offer has been added as a second transaction to the same order together with the first transaction. The customer need not be aware that the post-transaction offer was completed after the first transaction was complete, and may perceive both the first and second transactions as being the same transaction. The thank you page 730a may include a selectable option 734 that the customer may select to continue navigating the online store 138 (e.g., to view other products).

If the e-commerce platform 100 determines that the post-transaction offer should be blocked, the post-transaction offer page 720 is not presented (e.g., by performing the operation 614 of the method 600). Instead, immediately following the transaction complete page 710, the thank you page 730b is presented, without providing the post-transaction offer. The thank you page 730b may include information 732b about the first transaction only.

As illustrated in FIG. 7, the method 600 may enable the e-commerce platform 100 to dynamically (in real-time or near real-time) determine whether or not to provide a post-transaction offer to a customer at an online store 138. This may help to increase selling opportunities for the online store 138 while also helping to ensure the customer's experience on the online store 138 is a positive one, and helping to ensure efficient use of the resources (e.g., computing resources and memory resources) provided by the e-commerce platform 100.

In some examples, the post-transaction offer manager 350 may have more than one trust threshold 354, each of which may be associated with different characteristics. For example, a less restrictive trust threshold 354 (e.g., requiring a lower minimum value for the trust indicator 316) may be used for managing post-transaction offers provided by veteran or well-established online stores 138 (e.g., online stores 138 that have been operating on the e-commerce platform 100 for over 10 years, or online stores 138 that have annual sales exceeding $100,000), and a more restrictive trust threshold 354 (e.g., requiring a higher minimum value for the trust indicator 316) may be used for managing post-transaction offers provided by all other online stores 138. In another example, the trust threshold 354 may be tailored for each online store 138 and may exhibit a hysteresis effect (e.g., after the trust indicator 316 associated with a particular online store 138 has failed the trust threshold 354 once, the trust indicator 316 must satisfy a more restrictive trust threshold 354 before the online store 138 is permitted to provide post-transaction offers again).

In some examples, the post-transaction offer manager 350 may also manage the presentation format (e.g., the visual format) for providing a post-transaction offer, in addition to managing whether or not to provide a post-transaction offer. In particular, the post-transaction offer manager 350 may determine the trust indicator 316 associated with an online store 138 to determine whether or not an enhanced presentation format is permissible. It should be noted that changing a presentation format for a post-transaction offer is not equivalent to changing the post-transaction offer itself. That is, the parameters defining the offer itself (e.g., the product promoted, monetary value of the offer, etc.) are unchanged and may be outside the control of the e-commerce platform 100. A presentation format may affect only the aesthetics and customer perception (e.g., visual appearance) of the post-transaction offer. Certain presentation formats may be considered to be enhanced presentation formats that are expected to result in higher customer engagement (and hence expected to result in higher customer acceptance of the post-transaction offer), but which may also risk more strongly negative responses if provided to the wrong customers. For example, enhanced presentation formats, compared to normal presentation formats, may include a larger presentation area (e.g., occupying a larger footprint on the thank you page), an enhanced font (e.g., a larger font, a different font color and/or a different font style), inclusion of a graphic (e.g., an image of the promoted product, a store logo, etc.), and/or inclusion of an animation, among other possibilities. Because the trust indicator 316 is determined dynamically, the presentation format may also be dynamically determined in real-time (or near real-time).

Enhanced presentation formats may be only permitted if the trust indicator 316 associated with the online store 138 satisfies a more restrictive trust threshold 354 (e.g., requiring a higher minimum value for the trust indicator 316). For example, enhanced presentation formats may be offered as an encouragement or reward to merchants to improve customers' responses to post-transaction offers at their online stores 138.

Figure 8C:
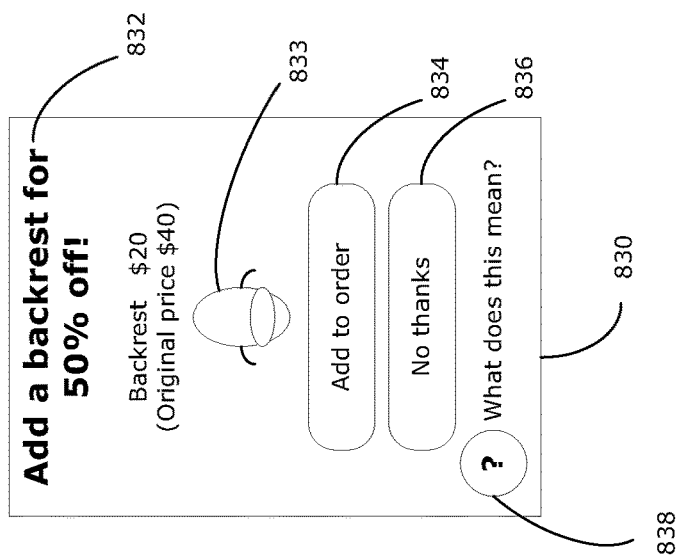
FIGS. 8A-8C illustrate some example presentation formats for post-transaction offers.
Figure 8B:
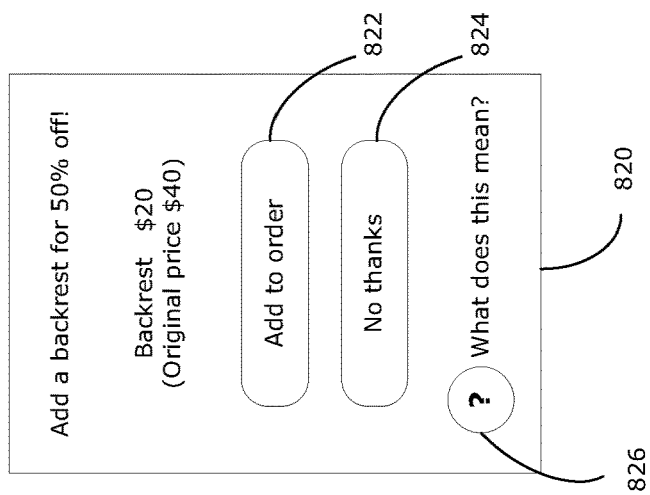
Figure 8A:
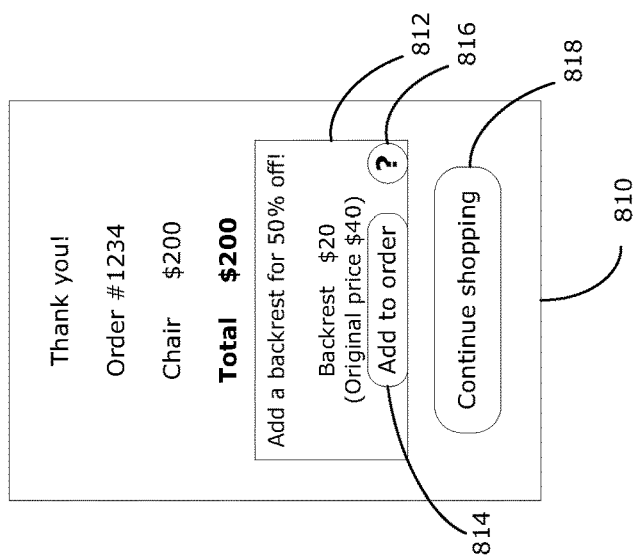

FIGS. 8A-8C illustrate simplified examples of different possible presentation formats for the same post-transaction offer. In this example, the post-transaction offer is a cross-sell offer with a 50% discount promotion.

In FIG. 8A, the post-transaction offer is presented in a smaller presentation area 812 on the thank you page 810. An option 814 to accept the post-transaction offer and a help option 816 are included in the presentation area 812. The thank you page 810 also includes an option 818 to leave the page (and thus decline the post-transaction offer).

In FIG. 8B, the post-transaction offer is presented in a larger presentation area, specifically as a standalone post-transaction offer page 820. An option 822 to accept the post-transaction offer, an option 824 to decline the post-transaction offer, and a help option 826 are included on the post-transaction offer page 820. The presentation format of the post-transaction offer in FIG. 8B may be enhanced compared to the presentation format of the post-transaction offer in FIG. 8A, because of the larger presentation area and the use of a standalone page to present the post-transaction offer.

In FIG. 8C, the post-transaction offer is again presented as a standalone post-transaction offer page 830. Compared to the example of FIG. 8B, the presentation format in FIG. 8C includes an enhanced font 832 (e.g., larger font), and inclusion of a graphic 833 (e.g., an image of the promoted product). An option 834 to accept the post-transaction offer, an option 836 to decline the post-transaction offer, and a help option 838 are also included on the post-transaction offer page 830. The presentation format of the post-transaction offer in FIG. 8C may be enhanced compared to the presentation format of the post-transaction offer in FIG. 8B, because of the enhanced font 832 and inclusion of the graphic 833.

FIGS. 8A-8C illustrate different presentation formats for the same post-transaction offer. The presentation format of FIG. 8A may be the default presentation format that is permitted if a default first trust threshold 354 is satisfied. The presentation format of FIG. 8B may more enhanced than that of FIG. 8A, and may be permitted only if a second trust threshold 354, more restrictive than the default first trust threshold 534, is satisfied. The presentation format of FIG. 8C may be more enhanced than that of both FIGS. 8A and 8B, and may be permitted only if a third trust threshold 354, more restrictive than the second trust threshold 534, is satisfied.

In various examples, the present disclosure describes systems and methods that enable automatic and dynamic control of post-transaction offers. The ability to dynamically (in real-time or near real-time) whether to provide a post-transaction offer may enable optimization of selling opportunities while avoiding a negative customer experience.

The disclosed systems and methods may collect customer response data across multiple online stores, and across multiple customers (or customer groups). This allows the e-commerce platform to account for customer responses across the entire platform, in determining whether to permit post-transaction offers at any given online store and for any given customer. Further, a newer online store may benefit from information about customer responses at other (more veteran) online stores.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method comprising:
   during a real-time, online checkout process for a first transaction associated with an online store, generating one or more online pages corresponding to a sequence of the online checkout process, the one or more pages including at least one page to review the first transaction and at least one page to confirm completion of the first transaction;
   prior to generating a final page in the sequence of the online checkout process, determining whether to generate a page including a post-transaction offer, wherein the determining comprises:
      computing, in real-time during the online checkout process, a first metric associated with the online store, the first metric being a quantifier of positivity of historical customer response to the same or different post-transaction offer at the online store; and
      comparing the first metric with a defined first threshold;
   responsive to determining that the first metric satisfies the first threshold, providing a page including the post-transaction offer inserted within that page.

2. The method of claim 1, further comprising:
   receiving, responsive to the providing of the page including the post-transaction offer, an indicator that the post-transaction offer was accepted; and
   responsive to receiving the indicator, completing a second transaction for the post-transaction offer using information associated with the first transaction.

3. The method of claim 2, wherein the first and second transactions are grouped into a single order.

4. The method of claim 1, further comprising:
   during another real-time, online checkout process for a third transaction associated with the online store, generating another one or more online pages corresponding to another sequence of the other online checkout process;
   prior to generating a final page of the other online checkout process, determining whether to generate another page including the post-transaction offer, wherein the determining comprises:
      computing, in real-time during the other online checkout process, a second metric associated with the online store, the second metric being another quantifier of a positivity of historical customer response to the same or different post-transaction offer at the online store; and
      comparing the second metric with the first threshold;
   responsive to determining that the second metric fails the first threshold, omitting the post-transaction offer from being included in the one or more online pages of the other sequence of the other online checkout process.

5. The method of claim 4, further comprising:
   responsive to determining that the second metric fails the first threshold, generating a notification that the post-transaction offer was blocked.

6. The method of claim 4, wherein the first transaction is associated with a first customer characteristic and the first metric is based on historical customer response associated with the first customer characteristic, and wherein the third transaction is associated with a second customer characteristic and the second metric is based on historical customer response associated with the second customer characteristic.

7. The method of claim 1, wherein computing the first metric comprises:
   determining the first metric in real-time, during the online checkout process, from customer response data collected from across a plurality of online stores, based on at least one of:
      historical customer response, from a plurality of customers, to any post-transaction offers by one or more other online stores having a characteristic in common with the online store;
      historical customer response, from a plurality of customers, to the same post-transaction offer at one or more other online stores;
      historical customer response, from a plurality of customers, to any post-transaction offers, associated with a customer characteristic in common with the first transaction; or
      historical customer response, from a plurality of customers, to any post-transaction offers having an offer characteristic in common with the same post-transaction offer.

8. The method of claim 7, wherein the historical customer response includes measurements of one or more of:
   a historical conversion rate;
   a historical refund rate; or
   a historical help request rate.

9. The method of claim 1, further comprising:
   responsive to determining that the first metric satisfies a second threshold that is more restrictive than the first threshold, providing the page including the post-transaction offer using an enhanced presentation format.

10. The method of claim 9, wherein the enhanced presentation format includes one or more of:
    a larger presentation area;
    an enhanced font;
    an animation; or
    a graphic.

11. The method of claim 1, wherein the page including the post-transaction offer is or immediately precedes the final page in the sequence of the online checkout process.

12. A system comprising:
    a processor in communication with storage, the processor configured to execute instructions from the storage to cause the system to:
       during a real-time, online checkout process for a first transaction associated with an online store, generate one or more online pages corresponding to a sequence of the online checkout process, the one or more pages including at least one page to review the first transaction and at least one page to confirm completion of the first transaction;
       prior to generating a final page in the sequence of the online checkout process, determine whether to generate a page including a post-transaction offer, wherein the determining comprises:
          computing, in real-time during the online checkout process, a first metric associated with the online store, the first metric being a quantifier of positivity of historical customer response to the same or different post-transaction offer at the online store; and
          comparing the first metric with a defined first threshold;
       responsive to determining that the first metric satisfies the first threshold, provide a page including the post-transaction offer inserted within that page.

13. The system of claim 12, wherein the processor is configured to execute instructions to further cause the system to:
- receive, responsive to the providing of the page including the post-transaction offer, an indicator that the post-transaction offer was accepted; and
- responsive to receiving the indicator, complete a second transaction for the post-transaction offer using information associated with the first transaction.

14. The system of claim 12, wherein the processor is configured to execute instructions to further cause the system to:
- during another real-time, online checkout process for a third transaction associated with the online store, generate another one or more online pages corresponding to another sequence of the other online checkout process;
- prior to generating a final page of the other online checkout process, determine whether to generate another page including the post-transaction offer, wherein the determining comprises:
  - computing, in real-time during the other online checkout process, a second metric associated with the online store, the second metric being another quantifier of a positivity of historical customer response to the same or different post-transaction offer at the online store; and
  - comparing the second metric with the first threshold;
- responsive to determining that the second metric fails the first threshold, omit the post-transaction offer from being included in the one or more online pages of the other sequence of the other online checkout process.

15. The system of claim 14, wherein the processor is configured to execute instructions to further cause the system to:
- responsive to determining that the second metric fails the first threshold, generate a notification that the post-transaction offer was blocked.

16. The system of claim 14, wherein the first transaction is associated with a first customer characteristic and the first metric is based on historical customer response associated with the first customer characteristic, and wherein the third transaction is associated with a second customer characteristic and the second metric is based on historical customer response associated with the second customer characteristic.

17. The system of claim 12, wherein the processor is configured to execute instructions to cause the system to compute the first metric by:
- determining the first metric in real-time, during the online checkout process, from customer response data collected from across a plurality of online stores, based on at least one of:
  - historical customer response, from a plurality of customers, to any post-transaction offers by one or more other online stores having a characteristic in common with the online store;
  - historical customer response, from a plurality of customers, to the same post-transaction offer at one or more other online stores;
  - historical customer response, from a plurality of customers, to any post-transaction offers, associated with a customer characteristic in common with the first transaction; or
  - historical customer response, from a plurality of customers, to any post-transaction offers having an offer characteristic in common with the same post-transaction offer.

18. The system of claim 17, wherein the historical customer response includes measurements of one or more of:
- a historical conversion rate;
- a historical refund rate; or
- a historical help request rate.

19. The system of claim 12, wherein the processor is configured to execute instructions to further cause the system to:
- responsive to determining that the first metric satisfies a second threshold that is more restrictive than the first threshold, provide the page including the post-transaction offer using an enhanced presentation format.

20. A non-transitory computer-readable medium storing instructions that, when executed by a processor of a system, cause the system to:
- during a real-time, online checkout process for a first transaction associated with an online store, generate one or more online pages corresponding to a sequence of the online checkout process, the one or more pages including at least one page to review the first transaction and at least one page to confirm completion of the first transaction;
- prior to generating a final page in the sequence of the online checkout process, determine whether to generate a page including a post-transaction offer, wherein the determining comprises:
  - computing, in real-time during the online checkout process, a first metric associated with the online store, the first metric being a quantifier of positivity of historical customer response to the same or different post-transaction offer at the online store; and
  - comparing the first metric with a defined first threshold;
- responsive to determining that the first metric satisfies the first threshold, provide a page including the post-transaction offer inserted within that page.

* * * * *